US008419281B2

(12) United States Patent
Hibi et al.

(10) Patent No.: US 8,419,281 B2
(45) Date of Patent: Apr. 16, 2013

(54) BEARING MEMBER AND METHOD FOR MANUFACTURING THE SAME, AND BEARING UNIT HAVING BEARING MEMBER AND METHOD FOR MANUFACTURING THE SAME

(75) Inventors: Kenji Hibi, Kuwana (JP); Yasuhiro Yamamoto, Kuwana (JP); Tetsuya Yamamoto, Kuwana (JP); Mitsuo Sasabe, Kuwana (JP)

(73) Assignee: NTN Corporation, Osaka-shi, Osaka (JP)

(*) Notice: Subject to any disclaimer, the term of this patent is extended or adjusted under 35 U.S.C. 154(b) by 1197 days.

(21) Appl. No.: 12/066,463

(22) PCT Filed: Sep. 5, 2006

(86) PCT No.: PCT/JP2006/317508
§ 371 (c)(1),
(2), (4) Date: Oct. 24, 2008

(87) PCT Pub. No.: WO2007/034671
PCT Pub. Date: Mar. 29, 2007

(65) Prior Publication Data
US 2009/0103840 A1     Apr. 23, 2009

(30) Foreign Application Priority Data

Sep. 20, 2005 (JP) ................. 2005-272152
Nov. 17, 2005 (JP) ................. 2005-333292
Nov. 28, 2005 (JP) ................. 2005-341921
Dec. 15, 2005 (JP) ................. 2005-362364

(51) Int. Cl.
F16C 32/06 (2006.01)
F16C 31/02 (2006.01)
F16C 33/02 (2006.01)
B29D 33/00 (2010.01)

(52) U.S. Cl.
USPC ........... 384/100; 384/114; 384/119; 264/279; 29/898.054

(58) Field of Classification Search .............. 384/100, 384/107, 114–115, 123, 625, 907, 909; 264/279, 264/628, 629, 667; 29/888.047, 898.054
See application file for complete search history.

(56) References Cited

U.S. PATENT DOCUMENTS 4,254,961 A * 3/1981 Fersht et al. ............... 384/100
4,774,749 A * 10/1988 Furumura ................ 29/898.055
(Continued)

FOREIGN PATENT DOCUMENTS

DE   10156345 A1 * 5/2002
EP     856673 A2 * 8/1998
(Continued)

OTHER PUBLICATIONS

International Search Report of PCT/JP2006/317508, date of mailing Dec. 26, 2006.

*Primary Examiner* — Marcus Charles
(74) *Attorney, Agent, or Firm* — Westerman, Hattori, Daniels & Adrian, LLP

(57) ABSTRACT

An inner periphery of a molded part having a step from an inner periphery of an electroformed part is molded to a nonconductive coating which covers the surface of a master. When the nonconductive coating is removed, a radial clearance having a diameter greater than that of a bearing clearance is created between the inner periphery of the molded part, which is exposed to the interior, and an outer periphery of a shaft member. A bearing member which forms the bearing and radial clearance with the shaft member is manufactured by performing electroforming on the master with the nonconductive coating formed on part of the surface of the master, thereby forming the electroformed part; then injection molding the bearing member with the electroformed part and the nonconductive coating on the surface of the master inserted into a cavity; and then removing the nonconductive coating from the bearing member.

4 Claims, 17 Drawing Sheets

U.S. PATENT DOCUMENTS

| | | | |
|---|---|---|---|
| 4,875,263 A * | 10/1989 | Furumura | 29/898.02 |
| 6,534,889 B2 * | 3/2003 | Katagiri et al. | 310/91 |
| 2002/0150840 A1 * | 10/2002 | Katsumura et al. | 430/320 |
| 2004/0179294 A1 | 9/2004 | Asada et al. | |
| 2004/0258335 A1 * | 12/2004 | Shimizu et al. | 384/100 |
| 2006/0056751 A1 * | 3/2006 | Engesser et al. | 384/100 |
| 2006/0078240 A1 * | 4/2006 | Braun | 384/107 |

FOREIGN PATENT DOCUMENTS

| | | | |
|---|---|---|---|
| EP | 1136710 A1 * | 9/2001 | |
| FR | 2808055 A1 * | 10/2001 | |
| FR | 2812045 A1 * | 1/2002 | |
| JP | 2000145786 A * | 5/2000 | |
| JP | 2001030266 A * | 2/2001 | |
| JP | 2002-174225 A | 6/2002 | |
| JP | 2003-56552 A | 2/2003 | |
| JP | 2003056569 A * | 3/2003 | |
| JP | 2004-183865 A | 7/2004 | |
| WO | WO 03036111 A1 * | 5/2003 | |
| WO | WO 2004022989 A1 * | 3/2004 | |

* cited by examiner

BEARING MEMBER AND METHOD FOR MANUFACTURING THE SAME, AND BEARING UNIT HAVING BEARING MEMBER AND METHOD FOR MANUFACTURING THE SAME

CROSS-REFERENCE TO RELATED APPLICATIONS

This application is a 371 National Stage of PCT/JP2006/317508, filed Sep. 5, 2006, and claims the benefit of priority of Japanese Application No. 2005-272152, filed on Sep. 20, 2005, Japanese Application No. 2005-333292, filed Nov. 17, 2005, Japanese Application No. 2005-341921, filed Nov. 28, 2005 and Japanese Application No. 2005-362364, filed Dec. 15, 2005, the entire contents all of which are incorporated by reference.

TECHNICAL FIELD

The present invention relates to a bearing member and a method for manufacturing the same. The present invention also relates to a bearing unit which includes a bearing member and a shaft that creates a bearing clearance with an inner periphery of this bearing member, and a method for manufacturing the same.

BACKGROUND ART

Bearing members of this type are suitably used as bearing members that form a bearing surface with a deposited surface of their electroformed part, utilizing the fact that the surface deposited on the surface of a master, or the molding matrix of this electroformed part, can be formed with high precision after the surface accuracy of the master surface.

For example, Japanese Patent Application Laid-Open No. 2003-56552 (Patent Document 1) has disclosed a bearing member which has an electroformed part integrally die formed as an insert, and a bearing unit which includes the same. This bearing member is formed by: forming an cylindrical electroformed part, or electroforming shell, by deposition on a master shaft, or a molding matrix of the electroformed part, at an area other than a nonconductive masked portion; die forming the bearing member of resin with this electroformed part as an insert; and then separating the electroformed part of the bearing member from the master shaft, so that the inner periphery of the electroformed part, the separation surface, can be directly used as a bearing surface. According to this bearing member, the inner periphery of the electroformed part or electroforming shell forms the shaft hole of the bearing member, with a high roundness, a high dimensional accuracy of the inner diameter, and favorable slidability. The clearance to a shaft member to be inserted into the shaft hole can be minimized for precise rotation, sliding, or sliding rotation.

Moreover, as disclosed in Japanese Patent Application Laid-Open No. Hei 10-246223 (Patent Document 2), ones having a bearing member made of resin for the sake of reduced material cost and machining cost have been known recently.

[Patent Document 1] Japanese Patent Application Laid-Open No. 2003-56552.

[Patent Document 2] Japanese Patent Application Laid-Open No. Hei 10-246223.

DISCLOSURE OF THE INVENTION

Problems to be Solved by the Invention

In the bearing members formed by the foregoing techniques, the electroformed part and the master shaft are separated by releasing a residual stress. After the separation, the clearance between the outer periphery of the master shaft and the inner periphery of the electroformed part has an axially uniform width. Conventionally, the electroformed part is formed over the entire axial length of the bearing member. According to the foregoing techniques, it is therefore only possible to obtain a clearance of uniform width between the inner periphery of the bearing member and the outer periphery of the bearing member across the entire length of the bearing member.

Nevertheless, clearances of partially different widths may sometimes be required depending on the characteristics required of the bearings. For example, when forming a sealing space at an end of a bearing member for the sake of avoiding oil leakage or the like, or when forming a relief portion or an oil receiver between two bearing surfaces, a clearance having a width greater than that of the bearing clearance must be created between the inner periphery of the bearing member and the outer periphery of the shaft member.

Such a clearance having a radial dimension different from that of the bearing clearance (different-diameter clearance) can be formed, for example, by post-machining the inner periphery of the electroformed part to increase the dimension of its inner diameter. Nevertheless, it is impractical in terms of accuracy and cost since the electroformed part typically has a thickness of no greater than 1 mm.

When the bearing member is made of resin as mentioned above, small steps on the inner periphery can be molded by providing the mold with portions corresponding to these steps. This entails an unfavorable increase in the machining cost of the mold, however.

In view of the foregoing circumstances, it is a technical challenge of the present invention to create a different-diameter clearance of high precision at low cost, thereby improving bearing performance and sealing capability.

Means for Solving the Problems

To solve the foregoing problems, the present invention provides a bearing member which includes an electroformed part, and a molded part formed integrally with the electroformed part, a bearing surface for supporting a shaft member being formed on an inner periphery of the electroformed part, and wherein its inner periphery is composed of an inner periphery of the molded part and the inner periphery of the electroformed part, and the inner periphery of the molded part is a molded surface having a step from the inner periphery of the electroformed part.

As above, according to the present invention, the inner periphery of the bearing member is composed of the inner periphery of the molded part and the inner periphery of the electroformed part. The outer periphery of the shaft member therefore creates a clearance not only with the inner periphery of the electroformed part but also with the inner periphery of the molded part. Here, since the inner periphery of the molded part has a step from the inner periphery of the electroformed part, a different-diameter clearance can be formed between the inner periphery of the molded part and the outer periphery of the shaft member. Moreover, the inner periphery of the electroformed part formed by electroforming is obtained with high precision, and the inner periphery of the molded part is also obtained with high precision since the inner periphery of the molded part is a molded surface. Consequently, the different-diameter clearance formed between these inner peripheries and the outer periphery of the shaft member can be obtained with high precision.

The bearing member according to the foregoing configuration may be provided, for example, in the form of a bearing unit which includes this bearing member and the shaft member inserted into an interior of the bearing member, and wherein the inner periphery of the molded part and the outer periphery of the shaft member create a radial clearance therebetween. In this case, the radial clearance may form a sealing space. Otherwise, the radial clearance may form a relief portion.

Concerning the shape of the different-diameter clearance, the inner periphery of either one of the electroformed part and the molded part may be arranged on both axial sides of the inner periphery of the other. For example, if the radial clearance forms a sealing space, the inner periphery of the molded part is preferably arranged on both axial sides of the inner periphery of the electroformed part so that the radial clearance is created on both axial ends of the bearing unit. Moreover, if the radial clearance forms a relief portion, the inner periphery of the electroformed part is preferably arranged on both axial sides of the inner periphery of the molded part so that the radial clearance is created between the plurality of bearing surfaces. It is understood that the different-diameter clearance according to the present invention is not limited to the configurations of the abovementioned examples, but may take various forms.

To solve the foregoing problems, the present invention also provides a method for manufacturing a bearing member having a bearing surface on its electroformed part, the method including: performing electroforming by using a master having a nonconductive coating formed on part of its surface; then performing injection molding with the electroformed part and the nonconductive coating on the surface of the master inserted; and subsequently removing the nonconductive coating. It should be noted that the "electroforming" according to the present invention covers electrolytic plating, electroless plating, and a combined process of these. As employed herein, the electroless plating refers to a method of depositing metal by the action of a reducer added to an aqueous solution of metal salt without using electricity.

If the inner periphery of the bearing member, including the inner periphery of the electroformed part and the inner periphery of the molded part having a step from the inner periphery of the electroformed part, is formed by using a master of stepped shaft shape, for example, then the configuration of the inner periphery of the molded article basically depends on the configuration of the inner periphery of the master shaft. This lowers the flexibility of configuration of the inner periphery. Besides, each change in shape or each change in dimension requires the trouble of machining the master shaft, which contributes to increased cost.

In contrast, if electroforming is performed by using a master shaft having its surface partly coated with a nonconductive coating before injection molding is performed with the master shaft including the electroformed part and the nonconductive coating inserted, followed by separation of the master shaft and removal of the nonconductive coating, then the inner periphery of the bearing member is obtained independent of the surface configuration of the master. This can increase the flexibility of configuration.

In particular, suppose the bearing member has the structure that the inner periphery of either one of the electroformed part and the molded part is arranged on both axial sides of the inner periphery of the other. According to the former method (the method using a stepped master), the steps on the outer periphery of the master shaft and the steps on the inner periphery of the bearing member can axially interfere with each other when separating the master shaft after the injection molding. This can make the separation impossible depending on the step size. With the latter method according to the present invention, however, the master may have a uniform diameter, and it is therefore possible to preclude interference of this type and separate the master and the bearing member with reliability.

In addition, since the master may be one having a uniform diameter (in the shaft portion in particular), it is possible to cut down the manufacturing cost. The nonconductive coating has only to be formed on the surface of the master, and can thus be controlled relatively easily as compared to the cases of applying high-precision machining to the inner periphery. This allows a further reduction in cost.

The nonconductive coating may be formed on the master surface by using general-purpose coating methods such as spin coating. Aside from this, it is also possible to use other methods such as feeding small amounts of ink droplets to the master surface by ink jetting or the like, thereby forming the coating with an aggregation of this ink. For materials appropriate to the nonconductive coating, it is preferable, in view of working processes, to select and use resin materials that have excellent plating resistance (resistance against electrolyte solutions), environmental resistance, heat resistance, solubility to solvents, etc.

It should be noted that what molds the inner periphery of the resin part need not be the nonconductive coating that is intended for masking the master surface, but may be one that is removable after the molding of the resin part. For this reason, the different-diameter clearance may be created by a method for manufacturing a bearing member having a bearing surface on its electroformed part, the method including: performing electroforming by using a master having a nonconductive coating formed on part of its surface; then removing the nonconductive coating, and forming a resin layer in part or all of the removed area; then performing injection molding with the electroformed part and the resin layer on the surface of the master inserted; and subsequently removing the resin layer. In this case, the nonconductive coating may be made of materials that chiefly satisfy plating resistance. The resin layer may be made of materials that have excellent heat resistance and high solubility to solvents. This widens the choice of materials available, making it possible to select and use cheaper materials.

To solve the foregoing problems, the present invention also provides a bearing unit which includes: a bearing member having an inner periphery at least in part made of resin; and a shaft inserted into an interior of the bearing member so as to be capable of relative rotation, creating a bearing clearance from the opposed inner periphery of the bearing member, and wherein the resin part of the bearing member is made of liquid crystal polymer, and a small clearance is created between the shaft and the resin part by molding shrinkage of the resin part. It should be noted that liquid crystal polymer, as employed herein, includes not only the liquid crystal polymer itself but also ones that contain the liquid crystal polymer as base resin and are compounded with metal, inorganic materials, and other fillers.

When liquid crystal polymer is filled into a mold in a molten state, it typically shows a high orientation property along the inner walls of the mold, forming a highly-orientated layer called a skin layer at the surface of the molded article. In the meantime, it forms a randomly-orientated layer called core layer at locations away from the inner walls of the mold. As a result, the molded article of the liquid crystal polymer exhibits a particular behavior of molding shrinkage different from that of other resin materials. For example, when molded into a sleeve-like shape, the outer periphery of the molded article retreats radially inward while the inner periphery retreats radially outward (expands in diameter).

The present invention has been achieved by focusing attention to the foregoing behavior of molding shrinkage that occurs when the resin part is made of liquid crystal polymer, and is characterized in that the inner periphery (molded surface) of the resin part opposed to the shaft is made to retreat so as to create a small clearance between the shaft and the resin part.

According to this configuration, it is possible, for example, to form a small step on the inner periphery simultaneously with the molding of the resin part. A clearance of different size than the bearing clearance (different-diameter clearance) can thus be formed without the application of machining such as micromachining after the molding. Since the inner periphery of the bearing member requires no post-machining, the production of cuttings can be prevented as much as possible. Consequently, these machining processes or cleaning processes can be simplified significantly for cost reduction. Concerning the mold to be used for molding the resin part, the mold configuration can also be simplified for economical reasons since the small step and the like are formed by utilizing the molding shrinkage of liquid crystal polymer. Furthermore, requirements as to the size and forming position of the small clearance can be met with minimum changes to the mold configuration.

The small clearance between the shaft and the resin part may be formed, for example, on at least either one of the axial ends of the bearing member, in which case the small clearance functions as a space for sealing a fluid that is filled into the bearing clearance.

Otherwise, for example, a plurality of bearing clearances may be formed axially apart from each other so that the foregoing small clearance is formed between the adjacent bearing clearances as a small clearance greater than the clearance width of the bearing clearances. In this case, the small clearance functions as a relief portion with respect to the bearing clearance. Consequently, it is possible to provide a bearing unit which has high moment rigidity while suppressing loss torque and sliding friction as much as possible.

The bearing member may be die formed, for example, with a metal part of cylindrical shape as an insert. In this case, the major portion of the bearing member can be made of resin for reduced material cost. Meanwhile, the inner periphery of the bearing member which creates the bearing clearance can be made of metal so as to improve the wear resistance of the bearing surface which slides on the outer periphery of the shaft.

For example, the metal part may be formed by electroforming. In this case, the master shaft in use may have a uniform diameter. This can preclude the master shaft being pulled out by force, so that the inner periphery of the metal part is obtained with high accuracy of form. If the metal part is formed by electroforming, the flexibility of configuration increases as compared to metal parts that are formed by applying machining or plastic processing to metal materials. This makes it possible to control the shape and position of this small clearance easily.

To solve the foregoing problems, the present invention also provides a bearing unit which includes: a bearing including an electroformed part and a holding part for holding the electroformed part; and a shaft member inserted into an interior of the bearing, the electroformed part having a bearing surface opposed to an outer periphery of the shaft member, and wherein the shaft member has a small-diameter portion and a large-diameter portion, the holding part has a molded surface molded by the large-diameter portion of the shaft member, and both the bearing surface of the electroformed part and the molded surface of the holding part are opposed to an outer periphery of the small-diameter portion of the shaft member.

To solve the foregoing problems, the present invention also provides a method for manufacturing a bearing unit having a bearing including an electroformed part and a holding part for holding the electroformed part, and a shaft member inserted into an interior of the bearing, the electroformed part having a bearing surface opposed to an outer periphery of the shaft member, the method including: forming the electroformed part by using at least a small-diameter portion of the shaft member as a master, the shaft member having the small-diameter portion and a large-diameter portion; then molding the holding part for holding the electroformed part by injection molding using at least the large-diameter portion of the shaft member as an inner mold; then separating the shaft member from the electroformed part and the holding part; and situating an outer periphery of the small-diameter portion of the separated shaft member opposed to the molded surface of the holding part molded by the large-diameter portion of the shaft member.

As above, according to the present invention, the molded surface of the holding part molded by the large-diameter portion of the shaft member is opposed to the outer periphery of the small-diameter portion of the shaft member. The small clearance between this molded surface and the outer periphery of the small-diameter portion of the shaft member has a clearance width greater than that of the bearing clearance between the bearing surface and the shaft member, and can thus retain a greater amount of lubricating oil. As a result, this small clearance can function as an oil reservoir for supplying the oil to the bearing clearance, thereby avoiding troubles ascribable to a shortage of lubricating oil. The small clearance also provides a buffering function for absorbing volume changes of the lubricating oil filled in the bearing clearance with varying temperature, and can thus prevent the lubricating oil from leaking out of the bearing when expanded by rising temperature in the use environment of the bearing unit.

This small clearance is also created by situating the molded surface, which is molded with the large-diameter surface of the shaft member as an inner mold in the step of injection molding of the holding part, and the outer periphery of the small-diameter portion of the shaft member opposed to each other. That is, after the shaft member is separated from the electroformed part, the holding part, and the shaft member which are integrally molded by the injection molding, the shaft member can be simply moved in an axial direction to create the foregoing small clearance. It is therefore possible to form the oil reservoir at low cost without requiring an additional member or additional process.

Moreover, if such a small clearance is created at an end of the inner periphery of the bearing, this small clearance functions as a sealing space, and can thus also prevent the lubricating oil from leaking out.

To solve the foregoing problems, the present invention also provides a bearing member which includes: a bearing member including an electroformed part having a bearing surface in its interior and a die formed part formed integrally with the electroformed part; and a shaft inserted into the interior of the bearing member, creating a bearing clearance with the bearing surface, the bearing member further including a sealing space of tapered shape which communicates with the bearing clearance at an outer side of the bearing and gradually increases in radial dimension toward the outside of the bearing.

According to this configuration, if the internal space of the bearing is filled with a lubricating oil for use, and the lubricating oil in the bearing starts to leak out of the bearing for any reason, then the lubricating oil in the sealing space of tapered shape, lying on the outer side of the bearing than the bearing clearance, undergoes a pulling force in the direction of reducing the radial dimension (toward the interior of the bearing) by capillary force. When using the bearing unit, it is therefore possible to avoid leakage of the lubricating oil and ensure high cleanness.

Furthermore, according to the foregoing configuration, a space (sealing space) having a volume greater than that of the radial clearance (bearing clearance) between the bearing surface and the outer periphery of the shaft is created with the opposed outer periphery of the shaft. Consequently, such a sealing space can be used as a kind of oil reservoir, allowing an abundant supply of fluid to the bearing clearance with stability. In particular, while it must be admitted that this type of bearing unit essentially lacks in oil supply capability as compared to bearing units that have a bearing member of sintered metal, the provision of the tapered surface as described above can solve this problem. Since an improvement to the accuracy of form of the bearing member due to the formation of the bearing surface by the electroformed part and an increase in the retaining amount of oil both can be achieved in a compatible fashion, it is possible to exercise high bearing performance over a long period of time with stability.

Aside from being created by the tapered surface formed on the exterior of the shaft and the opposed inner periphery of the bearing member, the sealing space may be created by a tapered surface formed in the interior of the electroformed part and the opposed outer periphery of the shaft, or may be created by a tapered surface formed in the interior of the die formed part and the opposed outer periphery of the shaft. In the latter case in particular (when the tapered surface is formed on the bearing member), the tapered surface can be formed integrally and simultaneously with the electroformed part by electroforming, or can be formed integrally and simultaneously with the die formed part by die forming. Consequently, as compared to the cases where the tapered surface is formed separately from the electroformed part and the die formed part, the machining processes can be simplified to reduce the manufacturing cost.

Effect of the Invention

As has been described, according to the present invention, it is possible to create a different-diameter clearance of high precision at low cost, thereby improving the bearing performance and the sealing capability.

BEST MODE FOR CARRYING OUT THE INVENTION

Hereinafter, a first embodiment of the present invention will be described with reference to FIGS. 1 to 11.

FIG. 1 shows an example of a bearing unit 1 according to the first embodiment. In FIG. 1, the bearing unit 1 includes a shaft member 2 and a bearing member 3 into the interior of which the shaft member 2 can be inserted. Of these, the bearing member 3 is composed of an electroformed part 4 and a molded part 5, and is integrally injection molded of a resin material with the electroformed part 4 as an insert.

The inner periphery of the bearing member 3 excluding both axial ends is made of an inner periphery 4a of the electroformed part 4. The inner periphery 4a of the electroformed part 4 and the opposed outer periphery 2a of the shaft member 2 create a bearing clearance 6 having a clearance width C1 therebetween. Second molded surfaces 5a, 5a, which lie on both axial ends and constitute the inner periphery of the bearing member 3 with the inner periphery 4a, are formed along the outside surface (molding surface 9a1) of a nonconductive coating 9 as will be described later, and have a step from the inner periphery 4a of the electroformed part 4. In this embodiment, the second molded surfaces 5a are cylindrical surfaces having a constant radius, creating radial clearances 7 from the opposed outer periphery 2a of the shaft member 2. The radial clearances 7 have a clearance width C2 greater than the clearance width C1 of the bearing clearance 6.

In this embodiment, the radial clearances 7 make a space for sealing a lubricating oil that is filled into the bearing. When the bearing clearance 6 is filled with the lubricating oil, the oil level of the lubricating oil is always maintained within the sealing space (radial clearances 7, 7) at both axial ends. It should be appreciated that both the bearing clearance 6 and the radial clearances 7 shown in FIG. 1 are extremely small as compared to the shaft member 2 and the bearing member 3, whereas FIG. 1 shows the clearance width C1 of the bearing clearance 6 and the clearance width C2 of the radial clearances 7 as magnified (exaggerated) relative to the radial dimension of the shaft member 2 for easy understanding of the shape.

In the bearing unit 1 of the foregoing configuration, when the shaft member 2 makes a relative rotation, the lubricating oil filled in the bearing clearance 6 forms an oil film, and through this oil film the shaft member 2 is radially supported on the bearing member 3 so as to be capable of relative rotation. Here, the radial clearances 7, which make the sealing space, are formed next to the sides of the bearing clearance 6 where to open to the air. This prevents the lubricating oil from leaking out of the bearing from the bearing clearance 6 due to the relative rotation of the shaft member 2, whereby the lubricating oil can be retained inside the bearing.

Hereinafter, an example of the steps for manufacturing the bearing unit 1 will be described with emphasis on the steps for manufacturing the bearing member 3.

The shaft member 3 is manufactured through the steps of: forming the nonconductive coating 9 on the surface of a master 8 which is used in electroforming; performing electroforming on the master 8 which has the nonconductive coating 9, thereby forming the electroformed part 4; die forming (insert molding) the bearing member 3 with the master 8 having the electroformed part 4 and the nonconductive coating 9 as an insert; separating the electroformed part 4 and the master 8; and removing the nonconductive coating 9 from the bearing member 3.

The master 8, or the molding matrix of the electroformed part 4, has a shaft-like shape in this embodiment. For example, it is made of quenched stainless steel with a perfect circular profile in cross section, with an axially uniform diameter. Aside from stainless steel, the material of the master 8 may be arbitrarily selected regardless of whether metal or nonmetal as long as it has a masking capability, electric conductivity, and chemical resistance, like chromium based alloys and nickel based alloys.

The master 8 may be a solid shaft (solid-core shaft), as well as a hollow shaft or a solid-core shaft that has a hollow filled with resin. Moreover, the outer periphery of the master 8 is desirably finished with as high accuracy as possible since the accuracy directly governs the surface accuracy of the inner periphery 4a of the electroformed part 4, which serves as the bearing surface.

The surface of the master 8 excluding where to form the electroformed part 4 is provided with the nonconductive coating 9 which is intended for masking. In this embodiment, the nonconductive coating 9 is also intended to mold the second molded surfaces 5a of the molded part 5 so as to create the radial clearances 7 with the outer periphery 2a of the shaft member 2. For that purpose, as shown in FIG. 2, the nonconductive coating 9 formed on the surface of the master 8 is made thicker at locations (molding portions 9a) corresponding to the second molded surfaces 5a of the molded part 5 than in the other locations.

Various methods may be used to form the nonconductive coating 9 on the surface of the master 8. One of the examples is spin coating. It is also possible to employ other methods such as feeding small amounts of ink droplets to the master surface by ink jetting or the like, thereby forming the nonconductive coating 9 with an aggregation of these small amounts of ink. Between the methods mentioned above, the former method is superior in forming a coating of uniform thickness in a short time, and the latter method is superior in forming a coating of fine and complicated shape. It is therefore preferable to use the foregoing methods selectively depending on the shape of the nonconductive coating 9 to form.

Aside from the insulating property (anti-electrodeposition property), the nonconductive coating 9 is preferably made of material that has corrosion resistance against electrolyte solutions, as well as durability (heat resistance) against the molding temperatures of the molded part 5 to be described later, dissolvability (solubility) to solvents, etc. Among the examples are vinyl acetate resin, ethyl cellulose, acetyl butyl cellulose, and shellac (natural resin).

The electroforming is performed by immersing the master 8 into an electrolyte solution that contains such metal ions as Ni and Cu, and energizing the electrolyte solution to electrodeposit the intended metal(s) on the surface of the master 8 at areas excluding the nonconductive coating 9 (at the exposed areas of the outer periphery 8a). The electrolyte solution may contain sliding materials such as carbon, and stress relief materials such as saccharin if needed. The types of metals to deposit are selected as appropriate depending on property requirements, such as physical characteristics required of the bearing surface of the bearing, including hardness and fatigue strength, and resistance against the lubricating oil (oil resistance). It should be appreciated that the foregoing description of the electrolyte solution is common to the electrolyte solutions for use in the second to fourth embodiments to be described later.

Through the foregoing steps, as shown in FIG. 3, the electroformed shaft 10 is manufactured in which the electroformed part 4 is formed on the surface of the master 8 at the area excluding where the nonconductive coating 9 is formed. At this stage, the electroformed shaft 10 has the configuration that the electroformed part 4 of cylindrical shape is formed on an axial partial area of the outer periphery 8a of the master 8, and the molding parts 9a of the nonconductive coating 9 are formed next to both axial ends of the electroformed part 4. Note that the electroformed part 4 might cause a drop in the durability and the like of the bearing surface (inner periphery 4a) if it is too thin, and can lower the detachability from the master 8 if too thick. The optimum thickness is thus set to a range of, for example, 10 μm to 200 μm depending on the bearing performance and bearing size required, as well as the intended application and the like.

The electroformed shaft 10 manufactured through the foregoing steps is fed and placed, as an insert, into a mold for insert molding the bearing member 3.

FIG. 4 conceptually shows the step of insert molding the bearing member 3, in which a mold composed of a movable mold 11 and a fixed mold 12 is provided with runners 13, gates 14, and a cavity 15. In the example shown in FIG. 4, the gates 14 are point gates, a plurality of which are formed in the mold circumferentially at regular intervals, in positions corresponding to one of the axial ends of the molded part 5. Each gate 14 has a gate area that is set to an appropriate value according to the viscosity of the molten resin to be filled into and the shape of the molded article.

The electroformed shaft 10 is positioned and arranged in the mold of the foregoing configuration, in which state the movable mold 11 is brought closer to the fixed mold 12 for clamping. Here, both the electroformed part 4 and the nonconductive coating 9 formed on the surface of the electroformed shaft 10 (master 8) lie within the cavity 15. Next, in the clamped state, molten resin P is injected and filled into the cavity 15 through sprues (not shown), the runners 13, and the gates 14, thereby molding the molded part 5 integrally with the electroformed shaft 10.

Consequently, the molded part 5 is molded to the shape conforming to the cavity 15 which is formed inside the molds 11 and 12. Besides, the inner periphery of the molded part 5 is molded by the outer periphery 4b of the electroformed part 4 at the area lying radially outside the electroformed part 4 (first molded surface 5b). At areas lying on both axial ends of the electroformed part 4, the inner periphery of the molded part 5 is also molded by the molding surfaces 9a1 of the nonconductive coating 9 which make a part of the cavity 15 (second molded surfaces 5a, 5a).

The molten resin P may use crystalline polymers such as liquid crystal polymer (LCP), polyphenylene sulfide (PPS) resin, polyacetal resin, and polyamide resin, and amorphous resins such as polyphenylsulfone (PPSU), polyethersulfone (PES), and polyetherimide (PEI). These are just a few examples, of course, and any resin material that is appropriate for the intended application and the use environment of the bearing may be selected arbitrarily. Various types of fillers including reinforcing materials (regardless of form, whether fibrous or powder), lubricants, and conductive agents may be added if necessary.

After the mold is opened, the molded article having the master 8, the nonconductive coating 9, the electroformed part 4, and the molded part 5 integrally is released from the molds 11 and 12. In the subsequent separation step, this molded article is separated into a secondary molded article which is composed of the electroformed part 4, the nonconductive coating 9, and the molded part 5, and the master 8.

In the separation step, an impact is applied to the master 8 or the electroformed part 4, for example, so that the inner periphery 4a of the electroformed part 4 is detached from the outer periphery 8a of the master 8. Consequently, the master 8 is pulled out of the bearing member 3 (electroformed part 4).

Aside from the foregoing means of separation, the electroformed part 4 may be separated, for example, by means of a method of heating (or cooling) the electroformed part 4 and the master 8 to cause a difference in the amount of thermal expansion therebetween, or by using both the means (impact and heat) in combination.

After the electroformed part 4 is separated from the master 8, the nonconductive coating 9 remaining in the interior of the electroformed part 4 at both axial ends is dissolved by a solvent. This removes the nonconductive coating 9 to provide the finished product of the bearing member 3. The removal of the nonconductive coating 9 also exposes the second molded surfaces 5a of the molded part 5 to the interior of the bearing member 3.

A shaft member 2 that is fabricated separately from the pulled master 8 is inserted into the interior of the bearing member 3 formed thus, thereby completing the bearing unit 1 shown in FIG. 1. In this case, the radial clearances 7 formed between the second molded surfaces 5a and the outer periphery 2a of the shaft member 2 have a radial clearance width C2 which is greater by the radial thickness of the molding parts 9a of the nonconductive coating 9 than the radial clearance width C1 of the bearing clearance 6 between the inner periphery 4a of the electroformed part 4 and the outer periphery 2a of the shaft member 2.

As above, the inner peripheries 5a of the molded parts 5 adjoining to the inner periphery 4a of the electroformed part 4 across a step can be formed by: forming the electroformed part 4 with the nonconductive coating 9 formed on the surface of the master 8; molding the second molded surfaces 5a of the molded part 5 by the molding surfaces 9a1 of the nonconductive coating 9 in the subsequently insert molding of the molded part 5 (bearing member 3); and removing the nonconductive coating 9. This can also create the radial clearances 7 which axially adjoin to the bearing clearance 6 between the outer periphery 2a of the shaft member 2 and the inner periphery 4a of the electroformed part 4 and have a different radial clearance width (C1<C2). Consequently, the molding parts 9a of the nonconductive coating 9 can be adjusted in shape as appropriate so that the radial clearances between the inner periphery of the bearing member 3, including the inner periphery 4a of the electroformed part 4, and the outer periphery 2a of the uniform-diameter shaft member 2 inserted inside are shaped freely without being limited by the surface configuration of the master 8.

The outer periphery 8a of the master 8 need not have a shape (surface configuration) corresponding to the radial clearances 7. One having a cylindrical surface configuration with a constant diameter is applicable as in the foregoing embodiment. This precludes the master 8 being pulled out by force, and can thus avoid damaging the inner periphery 4a of the electroformed part 4 which makes the bearing surface.

Furthermore, according to the bearing unit 1 of this embodiment, the inner periphery 4a of the electroformed part 4 is formed with high accuracy. This allows high bearing performance (such as runout accuracy) even when establishing a small bearing clearance 6 (of the order of several micrometers) from the outer periphery 2a of the shaft member 2. Consequently, if the radial clearances 7 have a size such that the ratio of the clearance width C2 of the radial clearances 7 to the clearance width C1 of the bearing clearance 6 falls within $3 \leqq (C2/C1) \leqq 50$, for example, it is favorably possible to exercise high sealing capability and dust resistance (blocking the intrusion of foreign matters from exterior) as well.

Up to this point, the bearing unit 1 according to the first embodiment of the present invention and an example of its manufacturing steps have been described. The present invention is not limited to the foregoing description, however.

The foregoing example has dealt with the case where the electroformed part 4 is formed on the master 8 which has the nonconductive coating 9 formed on its surface, the molded part 5 (bearing member 3) is injection molded by using the electroformed shaft 10 having such a nonconductive coating 9 and the electroformed part 4 as an insert, and the second molded surfaces 5a are molded by the molding surfaces 9a1 of the nonconductive coating 9. Nevertheless, other methods may also be employed. For example, in one method feasible, as shown in FIG. 5, the electroformed part 4 may be deposited on the outer periphery 8a of the master 8 having the nonconductive coating 9 formed on its surface before the nonconductive coating 9 is removed and a resin layer 19 made of material different from that of the nonconductive coating 9 is formed in part of the area where this nonconductive coating 9 is removed. Then, the molded part 5 (bearing member 3) is molded by using the electroformed shaft 20 having the resin layer 19 as an insert (with the electroformed part 4 and the resin layer 19 inserted into the cavity 15), followed by the removal of the resin layer 19. In this case, the second molded surfaces 5a of the molded part 5 are molded to the surface 19a of the resin layer 19.

According to this method, it is unnecessary for the material of the nonconductive coating 9 to take account of heat resistance for injection molding and flowability for coat removal (flowability to the interior). In the meantime, the material of the resin layer 19 need not take account of corrosion resistance and the like for electroforming. This widens the choice of materials available for the respective coatings 9 and 19, thereby allowing the use of materials of lower prices. For example, the resin layer 19 may use such resins as vinyl acetate resin, acetyl butyl cellulose, and acetyl cellulose which dissolve in general-purpose solvents like acetone.

The foregoing example has also dealt with the case where the nonconductive coating 9, or the molding parts 9a in particular, is shaped to have a constant thickness. It is understood, however, that other shapes may be employed. FIG. 6 shows a first modification thereof, showing an enlarged essential part of the master 8 which has the electroformed part 4 formed on its exterior. In FIG. 6, a nonconductive coating 29 formed on the surface of the master 8 has differences in diameter, and axially adjoins to the electroformed part 4 at the large-diameter side. When the molded part 5 (bearing member 3) is molded with the electroformed shaft having the nonconductive coating 29 of such shape as an insert, as shown in FIG. 7, a large-diameter side inner periphery 5c which is molded to the shape of a large-diameter side molding surface 29a of the nonconductive coating 29 and a small-diameter side inner periphery 5d which is molded to the shape of a small-diameter side molding surface 29b are formed inside the molded part 5. Of these, the large-diameter side inner periphery 5c has a step from the inner periphery 4a of the electroformed part 4 which axially adjoins thereto. Consequently, when the shaft member 2 is inserted into the interior of the bearing member 3, a radial clearance 27 that axially has different clearance widths (C3>C4) is created between the large-diameter side inner periphery 5c and small-diameter side inner periphery 5d and the opposed outer periphery 2a of the shaft member 2.

In this case, the area of the radial clearance 27 having the clearance width C3 retains a relatively large amount of lubricating oil while the area of the radial clearance 27 having the clearance width C4 functions as a sealing space. This allows an abundant supply of the lubricating oil to the bearing surface that is formed by the inner periphery 4a of the electroformed part 4, or the bearing clearance 6, all the time even if the lubricating oil is not fed into the bearing continuously. This bearing unit can be used for a long period of time with stability.

FIG. 8 shows a second modification of the nonconductive coating 9 which can be formed on the surface of the master 8. The nonconductive coating 39 in FIG. 8 axially increases in thickness gradually into a so-called tapered shaped, and adjoins to the electroformed part 4 at its thin side (small-diameter side). When the molded part 5 (bearing member 3) is molded with the electroformed shaft having the nonconductive coating 39 of such shape as an insert, as shown in FIG.

9, a tapered inner periphery 5e which is molded to the shape of the tapered molding surface 39a of the nonconductive coating 39 is formed inside the molded part 5. The bottom side (small-diameter side) of the tapered inner periphery 5e has a step from the inner periphery 4a of the electroformed part 4 which axially adjoins thereto. Consequently, when the shaft member 2 is inserted into the interior of the bearing member 3, a radial clearance 37 that gradually increases in the clearance width C5 axially upward is created between the tapered inner periphery 5e and the opposed outer periphery 2a of the shaft member 2.

In this case, the radial clearance 37 produces a sealing action by capillary force. When compared to sealing spaces of constant diameter such as shown in FIG. 1, the radial clearance 37 can thus exercise a higher function of sealing.

In the foregoing examples, the nonconductive coatings 9, 29, and 39 are formed on the surface of the master 8 so as to create the radial clearances 7, 27, and 37 on both axial ends of the bearing member 3, whereas they may be formed in other locations. For example, the nonconductive coating 9 of predetermined thickness is formed on a location corresponding to the axial center of the bearing member 3 in advance, and electroforming is applied in this state. For example, as shown in FIG. 10, an inner periphery 5a having a diameter larger than that of the inner peripheries 4a of a plurality of electroformed parts 4 can thus be formed between the electroformed parts 4 as the molded surface of the molded part 5. Consequently, it is possible to provide a bearing member 3 in which a radial clearance 7 (clearance width C2; C2>C1), or a so-called relief portion, is formed between a plurality (two, in this shown example) of bearing clearances 6 (clearance width C1) which are formed axially apart from each other.

In any case, the radial clearances 7, 27, and 37 can be adjusted in position, shape, size, and the like by means of the nonconductive coatings 9, 29, and 39. For example, while the foregoing examples have dealt with the cases where the radial clearances 7, 27, and 37 are formed on both axial ends of the bearing member 3, they may be formed on either one of the axial ends alone. It is understood that the foregoing configuration is similarly applicable even when the inner periphery (the second molded surfaces 5a) of the molded part 5 is molded by the resin layer 19 shown in FIG. 5, instead of the nonconductive coatings 9, 29, and 39.

The foregoing examples have also dealt with the cases where the nonconductive coating 9, 29, or 39 is removed after the master 8 is pulled out. These steps may be performed in reverse order, however. More specifically, as long as the nonconductive coatings 9, 29, and 39 are dissolvable from the axial ends by a solvent, the nonconductive coatings 9, 29, and 39 may be removed before the pulling of the master 8. It is understood that when pulling out the master 8, the nonconductive coatings 9, 29, and 39 may be detached and removed from the molded part 5 along with the master 8 if possible. The master 8 need not necessarily be pulled out, of course, and may be directly used as the shaft member 2.

The foregoing examples have dealt with the cases where the molded part 5 to be integrally formed with the electroformed part 4 is formed by injection molding of resin. Nevertheless, the molded part 5 may be formed by die forming (molding) of other materials such as metal. In addition to this, the molded part 5 may be made, for example, of sintered metal which is formed by compacting (die forming) metal powder, followed by sintering.

The foregoing examples have also dealt with the cases where the bearing clearance 6 constitutes a fluid cylindrical bearing. Nevertheless, it is also possible to employ such configuration that the inner periphery 4a is provided with a dynamic pressure generating portion for generating the dynamic pressure action of fluid. For example, though not shown in the drawings, an area may be formed where a plurality of grooves tilted with respect to the axial direction (dynamic pressure generating grooves) are arranged in a herringbone configuration. Alternatively, again though not shown, a plurality of lobe surfaces may be formed, for example, on the inner periphery 4a so as to constitute a so-called multi-lobe bearing in which these lobe surfaces and the cylindrical outer periphery 2a of the shaft member 2 opposed to the lobe surfaces create circumferentially-wedged radial clearances therebetween. Aside from the inner periphery of the bearing member 3 (inner periphery 4a), these radial dynamic pressure generating portions may also be formed on the outer periphery 2a of the shaft member 2.

Moreover, the nonconductive coatings 9, 29, and 39 may also be formed in a circumferentially or axially discontinuous fashion, instead of being formed on the outer periphery 8a of the master 8 in a circumferentially continuous fashion as described above. One of the examples of the bearing surface configuration of circumferentially discontinuous formation, though not shown in the drawings, is a so-called step bearing in which the inner periphery 4a of the electroformed part 4 and the inner periphery of the molded part 5, which is molded by the nonconductive coating 9, 29, or 39, are arranged circumferentially alternately so that a plurality of axial grooves are formed in the inner periphery of the bearing member 3.

The foregoing examples have also dealt with a bearing unit that has a radial bearing part. The present invention is also applicable, however, to a bearing unit (bearing member) that is provided with a thrust bearing part (thrust bearing surface). For example, the present invention may also be applied, though not shown in the drawings, to a bearing member in which the inner periphery of the electroformed part makes as a radial bearing surface while an end face of the electroformed part (axially-orthogonal end face) makes a thrust bearing surface.

Furthermore, in the foregoing examples, the lubricating oil has been used as the fluid that is filled into the bearing unit 1 and forms a lubricating film in the bearing clearance. This is not restrictive, however, and it is possible to use gases such as air, flowable lubricants such as magnetic fluids, lubricating grease, etc.

The bearing unit described above can be built into and used in a motor intended for information devices, for example. Hereinafter, a configuration example where the bearing unit is applied to the aforementioned motor bearing will be described with reference to FIG. 11. It should be appreciated that parts and members having the same configuration and operation as in the embodiment shown in FIGS. 1 to 10 will be designated by like reference numerals, and a redundant description thereof will be omitted.

FIG. 11 shows a cross-sectional view of a motor 50 into which a bearing unit 51 is incorporated. This motor 50 is used as a spindle motor of a disk drive such as a HDD, and includes: the bearing unit 51 which rotatably supports a shaft member 52 without contact; a rotor (disk hub) 61 which is attached to the shaft member 52; and stator coils 62 and rotor magnets 63 which are opposed to each other across a radial gap, for example. The stator coils 62 are attached to the periphery of a bracket 64, and the rotor magnets 63 are attached to the interior of the disk hub 61. The disk hub 61 holds one or a plurality of disks D1 such as a magnetic disk. When the stator coils 62 are energized, electromagnetic forces between the stator coils 62 and the rotor magnets 63 rotate the rotor magnets 63, whereby the disk hub 61 and the disks D1 held on the disk hub 61 are rotated integrally with the shaft member 52.

In this embodiment, the bearing unit 51 includes a bearing member 53 and a shaft member 52 to be inserted into the interior of the bearing member 53. The bearing member 53 is composed of an electroformed part 54 of closed-bottomed cylindrical shape which opens at one end, and a molded part 55 which is formed integrally with the electroformed part 54. The inner periphery 55a of the molded part 55, which has a diameter larger than that of the inner periphery 54a of the electroformed part 54 and has a step from the inner periphery 54a, creates a radial clearance 57 for making a sealing space with the opposed outer periphery 52a of the shaft member 52. Here, the inner periphery 55a, as in the foregoing embodiment, is molded to the molding surface 9a1 of the nonconductive coating 9 formed on the surface of the master 8.

In the bearing unit 51 of the foregoing configuration, when the shaft member 52 is rotated, a film of lubricating oil is formed in a radial bearing clearance 56 between the outer periphery 52a of the shaft member 52 and the bearing surface (inner periphery 54a) of the bearing member 53. This forms a radial bearing part R1 which rotatably supports the shaft member 52 in the radial directions. At the same time, a thrust bearing part T1 for rotatably supporting the shaft member 52 in the thrust direction is formed between the bottom end 52b of the shaft member 52 and the opposed inner bottom 54b of the electroformed part 54.

While FIG. 11 shows the case where the thrust bearing part T1 is constituted as a so-called pivot bearing, the present invention may also be applied to a dynamic bearing which supports the shaft member 52 in the thrust direction without contact by using dynamic pressure generating means such as dynamic pressure generating grooves.

The bearing unit of the present invention is not limited to the above example, but is widely applicable for the purpose of supporting the rotating shaft of a motor. As described above, according to the present invention, it is possible to provide a bearing unit with excellent bearing performance including a sealing capability by means of high flexibility of shape at the inner periphery of the bearing member. The bearing unit can thus be suitably used for the purpose of supporting a rotating shaft, including the foregoing spindle motor for driving a magnetic disk such as HDD, as well as other small-sized motors for information devices which require high rotational accuracy, such as a spindle motor for driving a magneto-optical disk of an optical disk and a polygon scanner motor of a laser beam printer.

Hereinafter, a second embodiment of the present invention will be described with reference to FIGS. 12 to 19.

FIG. 12 shows an example of a bearing unit 101 according to the second embodiment. In FIG. 12, the bearing unit 101 includes a shaft 102 and a bearing member 103 into the interior of which the shaft 102 can be inserted. Of these, the bearing member 103 is composed of a cylindrical metal part 104 and a resin part 105, and is integrally injection molded of a resin material with the metal part 104 as an insert.

The inner periphery of the bearing member 103 excluding both axial ends is made of an inner periphery 104a of the metal part 104. The inner periphery 104a of this metal part 104 and the opposed outer periphery 102a of the shaft 102 create a bearing clearance 106 having a clearance width C11 therebetween. Both the axial ends of the inner periphery of the bearing member 103 are made of first inner peripheries 105a, 105a which are the inner periphery of the resin part 105, opposed to the outer periphery 102a of the shaft 102. In this embodiment, the first inner peripheries 105a and the opposed outer periphery 102a of the shaft 102 create therebetween small clearances 107 having a clearance width C12 larger than the clearance width C11 of the bearing clearance 106.

In this embodiment, the small clearances 107 make a space for sealing a lubricating oil that is filled into the bearing. When the bearing clearance 106 is filled with the lubricating oil, the oil level of the lubricating oil is always maintained within the sealing space (small clearances 107, 107) at both axial ends. It should be appreciated that both the bearing clearance 106 and the small clearances 107 shown in FIG. 12 are extremely small as compared to the shaft 102 and the bearing member 103, whereas FIG. 12 shows the clearance width C11 of the bearing clearance 106 and the clearance width C12 of the small clearances 107 as magnified (exaggerated) relative to the radial dimension of the shaft 102 for the sake of easy understanding of the shape.

In the bearing unit 101 of the foregoing configuration, when the shaft 102 makes a relative rotation, the lubricating oil filled in the bearing clearance 106 forms an oil film, and through this oil film the shaft 102 is radially supported on the bearing member 103 so as to be capable of relative rotation. Here, the small clearances 107, which make the sealing space, are formed next to the bearing clearance 106. This prevents the lubricating oil from leaking out of the bearing from the bearing clearance 106 due to the relative rotation of the shaft 102, whereby the lubricating oil can be retained inside the bearing. It should be appreciated that while the small clearances 107 serving as the sealing space are an annular space having an axially constant dimension, they may form a space that gradually increases in clearance width axially upward (toward the air open side), for example.

Hereinafter, an example of the steps for manufacturing the bearing unit 101 will be described with emphasis on the steps for manufacturing the bearing member 103.

The bearing member 103 is formed by die forming (insert molding) a resin material with the metal part 104 as an insert.

FIG. 13 conceptually shows the step of insert molding the bearing member 103, in which a mold composed of a fixed mold 111, a movable mold 112, and a pin 113 is provided with runners 114, gates 115, and a cavity 116. In this embodiment, the gates 115 are point gates, and are formed in a plurality of locations (three locations, for example) of the molding mold (fixed mold 111) circumferentially at regular intervals, in positions corresponding to one of the axial ends of the resin part 105 to mold. Each gate 115 has a gate area that is set to an appropriate value according to the viscosity of the molten resin to be filled into and the shape of the molded article. Incidentally, the pin 113 may be integrated with the fixed mold 111 or the movable mold 112 in use unless it interferes with the insertion of the metal part 104.

The metal part 104, the insert, has a cylindrical shape and is desirably made of a material that has a sliding property to the shaft 102, durability against the lubricating oil (oil resistance), heat resistance, and the like, depending on the material of the shaft 102 in use, for example. Since the inner periphery 104a of the metal part 104 constitutes a sliding surface (bearing surface) to the shaft 102, it is desirably finished with as high accuracy as possible.

A liquid crystal polymer (LCP) or a resin composition containing a liquid crystal polymer as its base resin is used as the molten resin P to be injected and filled into the cavity 116. When the liquid crystal polymer is combined with fillers, the types and the combination ratios of the fillers used are selected and determined as appropriate depending on the property requirements (strength, slidability, dimension stability, and conductivity).

With the mold of the foregoing configuration, the metal part 104 is placed inside the cavity 116 as fitted and fixed to the pin 113. Next, with the molds 111 and 112 clamped together, the molten resin P is injected and filled into the cavity 116 through sprues (not shown), the runners 114, and the gates 115, whereby the resin part 105 is integrally molded with the metal part 104. Here, the first inner peripheries 105*a* of the resin part 105, which make part of the internal periphery of the bearing member 103, are molded to the shape of the outer periphery 113*a* of the pin 113. The inner periphery other than the first inner peripheries 105*a* (the second inner periphery 105*b*) is molded to the shape of the outer periphery 104*b* of the internally-contacting metal part 104. In the stage prior to mold releasing, the first inner peripheries 105*a* have an inner diameter generally the same as that of the adjoining inner periphery 104*a* of the metal part 104.

After the mold is opened, the molded article having the metal part 104 and the resin part 105 integrally is released from the molds 111, 112, and 113. The result is the bearing member 103 which has the inner periphery 104*a* of the metal part 104 as a bearing surface (surface for rotationally supporting the shaft 102). The shaft 102 is inserted into the interior of this bearing member 103, and then the bearing clearance 106 created between the inner periphery 104*a* of the metal part 104 and the outer periphery 102*a* of the shaft 102 is filled with a lubricating oil to complete the bearing unit 101 shown in FIG. 12.

Now, if the resin part 105 is die formed by using resins other than liquid crystal polymer, for example, it is observed that the inner periphery (for example, the first inner peripheries 105*a*) tends to shrink radially inward with the formation (solidification) of the resin part 105. This makes the width C2 of the small clearance that is formed with the shaft 102 inserted inside smaller than the width C11 of the bearing clearance 106 that is formed between the metal part 104 and the shaft 102, possibly failing to create a small clearance (the first inner periphery 105*a* and the outer periphery 102*a* of the shaft 102 make contact with each other) in some cases. In contrast, according to the present invention, the resin part 105 is made of liquid crystal polymer. As a result, after the release of the bearing member 103, as shown in FIG. 14, the first inner peripheries 105*a* (full line in FIG. 14) exclusively produce a radially outward shrinkage (dotted line in FIG. 14) in the inner periphery of the resin part 105 at least in appearance. The finished product of the bearing member 103, as shown in FIG. 12, is thus shaped so that the first inner peripheries 105*a* of the resin part 105, which are continuous with the metal part 104 at both ends, have a diameter larger than that of the inner periphery 104*a*. Consequently, when the shaft 102 of constant diameter is inserted into the interior of the bearing member 103, the first inner peripheries 105*a* and the outer periphery 102*a* of the shaft 102 create a small clearance having the clearance width of C12 which is larger than the clearance width C11 of the bearing clearance 106.

As above, since the resin part 105 is die formed of liquid crystal polymer so that the first inner peripheries 105*a* of the resin part 105 subsequently retreat radially outward because of molding shrinkage, it is possible to create a small step between the inner periphery 104*a* of the metal part 104 and the first inner peripheries 105*a* of the resin part 105. This eliminates the need for the process of forming a small step on the inner periphery of the bearing member 103 by additional machining, plastic processing, or the like, and can reduce the process cost.

Moreover, according to this embodiment, as shown in FIG. 12, the surface portions of the resin part 105 including the first inner peripheries 105*a* are shaped to catch the metal part 104 from both axial sides. Consequently, the surface portions of the resin part 105 including the first inner peripheries 105*a* function as a retainer for the metal part 104.

It should be appreciated that in the foregoing configuration example (and in the configuration examples to be described below as well), the thickness of the resin part 105 lying radially outside the small clearances 107, or the ratio of the inner diameter to the outer diameter of the resin part 105, can affect the amount of the radially outward retreat of the first inner peripheries 105*a* of the resin part 105. This thickness or inner-to-outer diameter ratio is thus desirably adjusted to the clearance width of the sealing space (small clearances 107) required. Alternatively, the thickness or inner-to-outer diameter ratio of the resin part 105 may be axially or radially changed to control the small clearances 107 in shape. Aside from the diameter of the pin 113 and the thickness or inner-to-outer diameter ratio mentioned above, the amount of the radially outward retreat of the inner periphery (first inner peripheries 105*a*) of the resin part 105, which creates the small clearances 107, also depends on the amount and type of fillers compounded into the liquid crystal polymer. For example, the range of 2 μm to 30 μm can be achieved by adjusting the foregoing conditions.

Up to this point, an example of the bearing unit according to the second embodiment has been described. The bearing unit according to the present embodiment is not limited to the foregoing example, however, but may employ other configurations. Hereinafter, a description will be given of other configuration examples (modifications) of the bearing unit. In the following drawings, parts and members having the same configuration and operation as with the bearing unit 101 shown in FIG. 12 will be designated by like reference numerals, and redundant description thereof will be omitted.

FIG. 15 is a cross-sectional view showing a bearing unit 121 according to a first modification of the present embodiment. The bearing unit 121 in FIG. 15 is characterized in that one of axial ends of its bearing member 123 has a different form than shown in FIG. 12. More specifically, the bearing member 123 shown in FIG. 15 is closed at one axial end with the bottom portion 125*b* of a resin part 125, and a first inner periphery 125*a* is formed on the other end alone so as to create a small clearance 127 for making a sealing space with the opposed outer periphery 122*a* of a shaft 122. Here, the insert-side end 122*b* of the shaft 122 has a semispherical shape, and constitutes a pivot bearing with the opposed inner bottom 125*b*1 of the bottom portion 125*b*.

FIG. 16 is a cross-sectional view showing a bearing unit 131 according to a second modification of the present embodiment. A bearing member 133 in FIG. 16 has a different configuration than the bearing unit 121 shown in FIG. 15, in that the entire inner periphery of the resin part 125 of closed-bottomed cylindrical shape excluding the first inner periphery 125*a* is covered with a metal part 134 of similarly closed-bottomed cylindrical shape. In this case, the insert-side end 132*b* of a shaft 132 constitutes a dynamic bearing to be described later with the opposed inner bottom 134*b*1 of a bottom portion 134*b* of the metal part 134.

In either of the foregoing bearing units 121 and 131, the resin part 125 is injection molded of liquid crystal polymer with the metal part 104 (or the metal part 134) as an insert. The small clearance 127 is formed by making the first inner periphery 125*a* retreat radially outward by utilizing the same molding shrinkage as in FIG. 14.

The inner peripheries of the bearing members 123 and 133, closed at one axial end as above, are particularly difficult to machine by post-machining. If the large-diameter portion (first inner periphery 125*a*) is formed by utilizing molding shrinkage of the resin part 125 as in the present embodiment, however, it is possible to solve the problem concerned and form the bearing members 123 and 133 easily at low cost.

The foregoing examples have dealt with the cases where the first inner periphery 105a having a diameter larger than that of the inner periphery 104a of the metal part 104 is formed at the axial end of the bearing member 103 by utilizing the radially-outward retreat of the inner periphery (first inner periphery 105a) of the resin part 105 due to molding shrinkage. Nevertheless, the first inner periphery 105a may be formed in other locations.

FIG. 17 is a cross-sectional view showing a bearing unit 141 according to a third modification of the present embodiment. The bearing unit 141 in FIG. 17 has a different configuration than the foregoing bearing units 101, 121, and 131 in that a plurality of metal parts 104 are arranged axially apart from each other, and a third inner periphery 145c which retreats radially outward by molding shrinkage of a resin part 145 is provided between these plurality of metal parts 104. More specifically, the inner periphery of the resin part 145 includes: first inner peripheries 145a which are opposed to the outer periphery 102a of the shaft 102 at both axial ends; second inner peripheries 145b which are firmly fixed to the outer peripheries 104b of the metal parts 104; and the third inner periphery 145c which is formed between the inner peripheries 104a, 104a of the metal parts 104 and has a larger diameter as compared to the inner peripheries 104a of the metal parts 104 as if the first peripheries 145a do.

In this case, small clearances 147 having a width C12 larger than the width C11 of the bearing clearances 106 are formed between the first inner peripheries 145a and the opposed outer periphery of the shaft 102, and a small clearance 148 having a width C13 larger than the width C11 is formed between the third inner periphery 145C and the opposed outer periphery 102a of the shaft 102.

According to this configuration, when the shaft 102 makes a relative rotation, the bearing clearances 106 are formed at two axially-separated locations on the inner periphery of the bearing member 143. Besides, the small clearance 148 (also referred to as relief portion) having a diameter larger than that of the inner peripheries 104a is formed between the inner peripheries 104a, 104a of the metal parts 104 which create the bearing clearances 106. Consequently, the shaft 102 can be supported without contact at positions axially separated as much as possible, without increasing the bearing areas more than necessary. This makes it possible to avoid an increase in loss torque and enhance the moment rigidity. Moreover, the relief portion is formed on the third inner periphery 145c of the resin part 145 next to the inner peripheries 104a of the metal parts 104 simultaneously with the die forming of the bearing member 143. It is therefore possible to omit the processes for increasing the diameter of the inner peripheries 104a of the metal parts 104 in part by additional machining, plastic processing, or the like, with a reduction of the process cost.

Furthermore, while the foregoing examples have dealt with the cases where a metal material machined into a cylindrical shape is used as the metal part(s) 104, the present embodiment may employ metal parts that are formed by methods other than the foregoing, such as a electroformed metal part. In that case, though not shown in the drawings, an electroformed part of cylindrical shape, or electroforming shell, is formed on the master shaft, or the forming matrix of the electroformed part, at areas other than masked areas. Then, the resin part 105 is die formed while the electroformed part and the master shaft having the electroformed part formed on its exterior are placed inside the molds 111 and 112 as inserts, like the metal part 104 and the pin 113 fitted and fixed to the metal part 104 as shown in FIG. 12. Then, the master shaft is separated from the electroformed part to complete the bearing member 103 which has the electroformed part, or metal part 104, and the resin part 105. According to this method, the surface configuration of the master shaft is transferred to the inner periphery 104a of the electroformed part (metal part 104) with high precision of the order of micrometers. The inner periphery 104a having a high surface accuracy can thus be formed by using a master shaft that is finished to have an outer periphery of high precision. Consequently, it is possible to manage with high accuracy the clearance width C11 of the bearing clearance 106 which is formed between the inner periphery 104a and the opposed outer periphery 102a of the shaft 102.

Moreover, while the foregoing examples have dealt with the cases where the bearing member 103 is made of the cylindrical metal part 104 at areas other than the resin part 105, it need not necessarily be made of metal. Depending on the bearing performance required, the areas other than the resin part 105 may be made of other materials such as ceramics and resins excluding liquid crystal polymer.

The foregoing examples have also dealt with the cases where the inner periphery of the resin part 105 (the first inner peripheries 105a, 25a, 45a, and the third inner periphery 145c) is made to retreat radially outward, thereby creating a small clearance (radial clearance) with the opposed shaft 102. Nevertheless, according to the present invention, small clearances may be created at positions other than the foregoing as far as the small clearances are formed between the shaft 102 and the resin part 105 by molding shrinkage of the resin part 105 which is made of liquid crystal polymer.

The foregoing examples have also dealt with the cases where the bearing clearance 106 constitutes a fluid cylindrical bearing. Nevertheless, in other possible configurations, the inner periphery 104a may also have a dynamic pressure increasing portion for causing the operation of increasing the dynamic pressure of fluid. For example, though not shown in the drawings, an area may be formed where a plurality of grooves tilted with respect to the axial direction (dynamic pressure generating grooves) are arranged in a herringbone configuration. Alternatively, again though not shown, a plurality of lobe surfaces may be formed, for example, on the inner periphery 104a so as to constitute a so-called multi-lobe bearing in which these lobe surfaces and the cylindrical outer periphery 102a of the shaft 102 opposed to the lobe surfaces create circumferentially-wedged radial clearances therebetween. These radial dynamic pressure increasing portions may also be formed in the outer periphery 102a of the shaft 102 aside from the inner periphery (inner periphery 104a) of the bearing member 103.

For a dynamic pressure increasing portion in the thrust direction, though not shown in the drawings, an area having a plurality of dynamic pressure generating grooves in a herringbone arrangement or spiral arrangement may also be formed on the inner bottom surface 134b1 of the bottom portion 134b shown in FIG. 16, for example.

These dynamic pressure increasing portions, such as the area having a plurality of dynamic pressure generating grooves, can be formed by adjusting the inner periphery 104a of the metal part 104 and the inner periphery of the resin part having a diameter larger than that of the inner periphery 104a (the first inner peripheries 105a, 125a, 145a and the third inner periphery 145c) in size, shape, position, etc. The foregoing electroforming is particularly preferable since complicated surface patterns like the dynamic pressure increasing portion can be formed easily by simply setting an appropriate masking area.

Furthermore, the foregoing examples have used the lubricating oil as an example of the fluid that is filled into the bearing unit 101 and produces the dynamic pressure increasing effect in the bearing clearance. Nevertheless, it is also possible to use any other fluid that can produce a dynamic pressure increasing effect in the bearing clearance, like gases such as air, flowable lubricants such as magnetic fluids, lubricating grease, etc.

The bearing unit described above can be built into and used in a motor intended for information devices, for example. Hereinafter, a configuration example where the bearing unit is applied to a motor bearing will be described with reference to FIG. 18. It should be appreciated that parts and members having the same configuration and operation as in the embodiment shown in FIGS. 12 to 17 will be designated by like reference numerals, and a redundant description thereof will be omitted.

FIG. 18 shows a configuration example of a motor 150 into which a bearing unit 151 is incorporated. This motor 150 is used as a spindle motor of a disk drive such as a HDD, and includes: the bearing unit 151 which rotatably supports a shaft 152 without contact; a rotor (disk hub) 153 which is attached to the shaft 152; and stator coils 154 and rotor magnets 155 which are opposed to each other across a radial gap, for example. The stator coils 154 are attached to the exterior of a bracket 156, and the rotor magnets 155 are attached to the interior of the disk hub 153. The disk hub 153 holds one or a plurality of disks D2 such as a magnetic disk. When the stator coils 154 are energized, electromagnetic forces between the stator coils 154 and the rotor magnets 155 rotate the rotor magnets 155, whereby the disk hub 153 and the disks D2 held on the disk hub 153 are rotated integrally with the shaft 152.

In this configuration example, the bearing unit 151 includes a bearing member 157 and the shaft 152 to be inserted into the interior of the bearing member 157. The bearing member 157 is composed of: a metal part 104 of open-ended cylindrical shape and a metal part 134 of closed-bottomed cylindrical shape which are arranged axially apart from each other; and a resin part 158 which is die formed with these metal parts 104 and 134 as inserts. Of these, the inner peripheries 158a and 158b of the resin part 158 having a diameter larger than that of the inner peripheries 104a, 104a of the metal part 104 create a small clearance 159, or sealing space, and a small clearance 160, or relief portion, with the opposed outer periphery 152a of the shaft 152, respectively. Then, when the shaft 152 is rotated, a dynamic pressure increasing portion produces the action of increasing the dynamic pressure of the lubricating oil in the radial bearing clearances between the outer periphery 152a of the shaft 152 and the bearing surface (inner peripheries 104a) of the bearing member 157. This constitutes a radial bearing part R2 which rotatably supports the shaft 152 in the radial directions without contact. In the meantime, a thrust bearing part T2 for rotatably supporting the shaft 152 in the thrust direction is formed between the bottom end 152b of the shaft 152 and the opposed inner bottom 134b of the electroformed part 134.

The bearing unit according to the present embodiment is not limited to the foregoing example, but may be applied widely for the purpose of supporting the rotating shaft of a motor. This bearing unit has high sealing capability and high moment rigidity as mentioned above. The bearing unit can thus be suitably used for the purpose of supporting a rotating shaft, including that of the foregoing spindle motor for driving a magnetic disk such as HDD, as well as other small-sized motors for information devices which require high rotational accuracy, such as a spindle motor for driving a magneto-optical disk of an optical disk and a polygon scanner motor of a laser beam printer.

Now, for the sake of verifying the utility of the present invention, the resin part (bearing member) made of liquid crystal polymer was measured for the amount of molding shrinkage. Specifically, as shown in FIG. 19, a test piece having a closed-bottomed cylindrical shape of $\phi 9.5$ (outer diameter)$\times \phi 7.5$ (inner diameter of the thin area)$\times \phi 6.6$ (inner diameter of the thick area) was molded, and measured for the amount of molding shrinkage S1 at the thin area and the amount of molding shrinkage S at the thick area. As a result, both the thin area and the thick area produced molding shrinkage radially outward, with the amounts of shrinkage of S1 (thin area)=18 μm and S2 (thick area)=24 μm.

Hereinafter, a third embodiment of the present invention will be described with reference to FIGS. 20 to 28.

A bearing 205 (see FIG. 23) which constitutes the bearing unit according to the third embodiment of the present invention is fabricated through the steps of: forming an electroformed shaft 204 by electroforming, using a shaft member 201 as a master (see FIGS. 20 and 21); injection molding a resin into a holding part for holding an electroformed part 203 of the electroformed shaft 204 (see FIG. 22); and separating the electroformed part 203 and the shaft member 201.

As employed in the following description, a "bearing for rotation" shall refer to a bearing that supports a relative rotation between itself and the shaft member, regardless of whether the bearing is the rotating side or the stationary side. A "bearing for sliding" shall refer to a bearing that supports a linear motion between itself and the shaft, regardless again of whether the bearing is the moving side or the stationary side. A "bearing for rotation and sliding" shall refer to a bearing that has the functions of both the foregoing bearings, supporting both a rotational motion and a linear motion between itself and the shaft.

As shown in FIG. 20, the shaft member 201 is fabricated as a shaft having a large-diameter portion and a small-diameter portion with circular cross-sections, out of a conductive material such as quenched stainless steel. It is, of course, not limited to stainless steel. Suitable materials and heat treatment methods are selected depending on the properties required in view of the functions of the bearing and for the convenience of manufacturing of the bearing, including rigidity and other mechanical strengths, slidability, heat resistance, chemical resistance, and the workability and separability of the electroformed part 203. Nonmetal materials such as ceramics can also be used when given conductive processing (for example, by forming a conductive metal coating on the surface). For the sake of reducing friction against a bearing member when used in the bearing unit, the surface of the shaft member 201 is desirably coated with a fluorine-based resin, for example.

The shaft member 201 may be a solid-core shaft, as well as a hollow shaft or a solid-core shaft that has a hollow filled with resin. In bearings for rotation, the shaft member is basically formed with a circular cross section. With bearings for sliding, the cross section may have any shape, including polygonal shapes and noncircular shapes aside from circles. In the bearings for sliding, the sliding portion of the shaft member 201 is also formed to have a cross-section of axially-constant shape. With the bearings for rotation, the shaft member may sometimes have cross-sections of axially non-constant shapes.

Since the accuracy of the outer periphery of the shaft member 201 directly governs the accuracy of the bearing clearance to be described later, the surface precisions that are significant in terms of bearing functions, such as roundness, cylindrically, and surface roughness, must be finished to be high in advance. For example, in bearings for rotation, roundness is significant in view of avoiding contact with the bearing surface, and the outer periphery of the shaft member 201 must therefore be improved in roundness as much as possible. For example, it is desirably finished to fall to or below 80% the average width (radial dimension) of the bearing clearance to be described later. Consequently, assuming that the bearing clearance has an average width of 2 µm, for example, the outer periphery of the shaft member is desirably finished to a roundness of 1.6 µm or less.

As shown by the scattered points in FIG. 20, the outer periphery of the shaft member 201 is subjected to masking, excluding where to form the electroformed part 203. A coating material 202 for the masking is selected and used from among existing products that have nonconductivity and corrosion resistance against electrolyte solutions.

The electroforming is performed by immersing the shaft member 201 into an electrolyte solution that contains such metal ions as Ni and Cu, and energizing the electrolyte solution to deposit the intended metal(s) on the surface of the shaft member 201. The electrolyte solution may contain sliding materials such as carbon, and stress relief materials such as saccharin if necessary. The types of metals to electrodeposit are selected as appropriate depending on physical characteristics and chemical characteristics required of the bearing surface of the bearing, including hardness and fatigue strength. Too large thicknesses of the electroformed part 203 can lower detachability from the shaft member 201, and too small thicknesses can cause a drop in the durability and the like of the bearing surface. An optimum thickness is thus set according to required bearing performance, bearing size, and intended application, etc. For example, with a bearing for rotation having a shaft diameter of 1 mm to 6 mm, a thickness of 10 µm to 200 µm is preferred.

The electroformed shaft 204 is transferred to the injection molding step shown in FIG. 22, where insert molding is performed with the electroformed part 203 and the shaft member 201 as inserts.

In this injection molding step, as shown in FIG. 22, the electroformed shaft 204 is fed into the mold, which consists of an upper mold 207 and a lower mold 208, so that its axial direction is in parallel with the clamping direction (vertical direction in the diagram). The lower mold 208 has a positioning hole 210 which conforms to the outside diameter of the outer periphery 201b at the small-diameter portion of the shaft member 201. The bottom end of the electroformed shaft 204 transported from the previous step is inserted into this positioning hole 210, whereby the electroformed shaft 204 is positioned. The upper mold 207 has a guide hole 211 which is formed coaxially to the positioning hole 210, with an inner diameter conforming to the outside diameter of the outer periphery 201a at the large-diameter portion of the shaft member 201. When the movable mold (in FIG. 22, the upper mold 207) is brought closer to the fixed mold (in FIG. 22, the lower mold 208) for clamping, the top end of the electroformed shaft 204 is initially inserted into the guide hole 211 to center the electroformed shaft 204. The upper mold 207 and the lower mold 208 are brought even closer and into contact to complete clamping.

At the completion of the clamping shown in FIG. 22, the bottom end of the electroformed shaft 204 is in contact with the bottom of the positioning hole 210, and a step 201c formed between the outer periphery 201a of the large-diameter portion of the shaft member 201 and the outer periphery 201b of the small-diameter portion lies below the top end of the molding surface. In the example shown in FIG. 22, the electroformed part 203 is extended from the step 201c into contact with the bottom end of the molding surface. In this state, a resin material is injected into the cavity 209 through a sprue 212, a runner 213, and a gate 214 for insert molding.

The resin material to be injected is thermoplastic resin. Amorphous resins available include polysulfone (PSF), polyethersulfone (PES), polyphenylsulfone (PPSU), and polyetherimide (PEI). Crystalline resins available include liquid crystal polymer (LCP), polyetheretherketone (PEEK), polybutylene terephthalate (PBT), and polyphenylene sulfide (PPS). Fillers to fill the foregoing resin with are not limited in type, either. For example, fibrous fillers such as glass fiber, whisker-like fillers such as potassium titanate, scale-like fillers such as mica, and fibrous or powder conductive fillers such as carbon fiber, carbon black, graphite, carbon nanomaterial, and metal powder may be used. These fillers each may be used alone, or two or more types may be mixed in use.

It should be appreciated that the material to be injected may also be a metal material. For example, low-melting metal materials such as magnesium alloys and aluminum alloys may be used. This can improve the strength, heat resistance, conductivity, or the like as compared to the cases of using resin materials. Aside from this, a mixture of metal powder and a binder may be injection molded, followed by degreasing and sintering for so-called MIM molding.

After the mold is opened, the released molded article has the structure that the shaft member 201, the electroformed part 203, and the holding part 206 are integrated with each other as shown in FIG. 23. This molded article is then transferred to the separation step, and is separated into the bearing 205, which consists of the electroformed part 203 and the holding part 206, and the shaft member 201.

In this separation step, internal stress accumulated in the electroformed part 203 is released so that the inner periphery of the electroformed part 203 expands in diameter and is detached from the outer periphery of the shaft member 201. The internal stress is released by giving an impact to the shaft member 201 or the bearing 205, or by applying an axial pressure to between the inner periphery of the electroformed part 203 and the outer periphery of the shaft member 201. Since the release of the internal stress radially expands the inner periphery of the electroformed part 203 in diameter to create a clearance of appropriate size between the inner periphery 203a of the electroformed part 203 and the outer periphery 201b of the small-diameter portion of the shaft member 201, the shaft member 201 can be moved axially with respect to the inner periphery of the electroformed part 203. As a result, the molded article is separated into the bearing 205, consisting of the electroformed part 203 and the holding part 206, and the shaft member 201. It should be appreciated that the amount of expansion of the electroformed part 203 can be controlled, for example, by changing the thickness of the electroformed part 203, the composition of the electrolyte solution, and the electroforming conditions.

If the interior of the electroformed part 203 cannot be expanded sufficiently in diameter by the application of an impact alone, the electroformed part 203 and the shaft member 201 may be heated or cooled to produce a difference in the amount of thermal expansion therebetween so that the shaft member 201 and the bearing 205 are separated.

Moreover, the composition of the resin material and the molding conditions may be devised so that the surface where the holding part 206 is in contact with the shaft member 201 makes expansion due to molding shrinkage at the time of solidification after the injection molding. This can facilitate separating the holding part 206 and the shaft member 201.

After the bearing 205 and the shaft member 201 are separated thus, the shaft member 201 is moved upward so that the outer periphery 201b of the small-diameter portion of the shaft member 201 is opposed to the molded surface 206a of the holding part 206 which is molded by the large-diameter portion of the shaft member 201 (see FIG. 24). Here, the inner periphery 203a of the electroformed part 203 opposed to the outer periphery 201b of the small-diameter portion of the shaft member 201 functions as a bearing surface. The bearing clearance between this bearing surface and the outer periphery 201b of the small-diameter portion of the shaft member 201 is characterized by extremely small clearance size and high accuracy due to the properties of the electroforming. It is therefore possible to provide a bearing that has high rotational accuracy or slidability. In addition, the shaft member 201 has only to be moved as inserted in the interior of the bearing 205. This reduces the chances for foreign matter to get into, for example, as compared to the cases of removing the shaft member 201 from the bearing 205 before inserting a shaft member fabricated separately. There is thus less possibility of unusual noise production, component wear, or the like ascribable to foreign matter.

Moreover, the outer periphery 201b of the small-diameter portion of the shaft member 201 and the molded surface 206a of the holding part 206 create a small clearance 215 therebetween. As is evident from the foregoing manufacturing steps, the small clearance 215 is set to a clearance width larger than that of the bearing clearance. A lubricating oil is filled into the bearing clearance and the small clearance 215 to complete the bearing unit.

When the bearing 205 is in operation (rotation, sliding, or rotation and sliding), the lubricating oil retained in the small clearance 215 is supplied to the bearing clearance. Since the lubricating oil always lies in the bearing clearance abundantly, the production of unusual noise due to insufficient lubrication and the wearing caused by the contact sliding between the shaft member and the bearing 205, resulting from a shortage of oil, can be avoided for extended product life. The small clearance 215 also provides a buffering function, and can thus prevent the lubricating oil from leaking out of the bearing even if the volume of the lubricating oil increases with increasing temperature in the use environment of the bearing unit. This makes it possible to avoid such troubles as contamination of the ambient environment.

The small clearance 215 also functions as a sealing space, and can thus prevent the lubricating oil from leaking out and being scattered by the operation of the bearing 205. It is therefore possible to avoid a decrease of the lubricating oil, contamination of the ambient environment, and the like with higher reliability. The clearance width of the small clearance 215 is set within a range where a resulting capillary force can prevent the leakage of the lubricating oil, such as 0.5 mm or less, and desirably 0.3 mm or less.

The bearing unit according to the present embodiment is not limited to the foregoing example. In a first modification of the bearing unit shown in FIG. 25, the electroformed part 203 has an axial dimension smaller than in the bearing unit shown in FIG. 24, and the small clearance 215 and the electroformed part 203 are axially separated from each other. Since the electroformed part 203 is thus formed in a minimum necessary area alone, it is possible to reduce cost.

In a second modification of the bearing unit shown in FIG. 26, electroformed parts 231 and 232 are formed on the large-diameter inner periphery 205a and the small-diameter inner periphery 205b of the bearing 205, respectively. Consequently, even if the bearing unit is used without a lubricating oil, for example, the small clearance 215 formed between the molded surface (large-diameter inner periphery) of the holding part 206 molded by the large-diameter portion of the shaft member 201 and the outer periphery 201b of the small-diameter portion of the shaft member 201 functions as a relief portion. Since a plurality of bearing surfaces can be provided axially apart from each other, it is possible to increase the bearing rigidity against moment loads. Moreover, when the bearing unit is used with a lubricating oil filled into the bearing, the small clearance 215 formed between the molded surface (large-diameter inner periphery) of the holding part 206 molded by the large-diameter portion of the shaft member 201 and the outer diameter 201b of the small-diameter portion of the shaft member 201 can function as an oil reservoir to avoid a shortage of oil.

A third modification of the bearing unit shown in FIG. 27 differs from the foregoing bearing units in that the opening in the bottom end of the bearing 205 is closed by a thrust plate 223. In this case, as with the foregoing bearing units, the shaft member 201 is shifted upward to create a small clearance 215 between the outer periphery 201b of the small-diameter portion of the shaft member 201 and the molded surface 206a of the holding part 206 molded by the large-diameter portion of the shaft member 201. Then, the thrust plate 223 is fixed to the bottom opening of the bearing 205. In this modification, the bottom end 201d of the shaft member is formed into a convex spherical shape, and a thrust bearing part T3 for supporting the shaft member 201 in the thrust direction is formed between this bottom end 201d and the top surface 223a of the thrust plate 223.

Now, with reference to FIG. 28, a description will be given of an example where a bearing unit having the bearing described above is applied to support the rotating shaft of a motor 221.

The motor 221 shown in the diagram is a spindle motor to be used in a disk drive unit such as HDD. The bearing unit of this motor 221 has a radial bearing part R3 which rotatably supports the shaft member 201 in the radial directions, and a thrust bearing part T3 which rotatably supports it in the thrust direction. The radial bearing part R3 is constituted by the outer periphery of the shaft member 201 and the inner periphery of the electroformed part 203. The thrust bearing part T3 is constituted by supporting the shaft end of the shaft member 201 having a convex spherical shape by and in contact with the thrust plate 223 which is opposed to the end face of the bearing 205. The bearing 205, as described in the foregoing description, is formed by injection molding with the electroformed part 203 as an insert. Aside from this bearing unit, the motor 221 also includes: a rotor (disk hub) 224 to which the shaft member is attached; and stator coils 225 and rotor magnets 226 which are opposed to each other across a radial gap, for example. The stator coils 225 are attached to the exterior of a bracket 227, and the rotor magnets 226 are attached to the interior of the disk hub 224. The disk hub 224 holds one or a plurality of magnetic disks D3.

When the stator coils 225 are energized, the electromagnetic forces between the stator coils 225 and the rotor magnets 226 rotate the rotor magnets 226, whereby the disk hub 224 and the shaft member 201 are rotated integrally. Here, the oil retained in the small clearance 215 is supplied to the radial bearing part R3 and the thrust bearing part T3.

FIG. 28 shows the case where the thrust bearing part T3 is formed as a so-called pivot bearing. Aside from this, it is also possible to employ a dynamic bearing which supports the shaft member 201 in the thrust direction without contact by using dynamic pressure generating means such as dynamic pressure generating grooves. Otherwise, a flange part may be formed on the bottom end of the shaft member 201 so that it functions as a retainer in the bearing 205.

The bearing unit of the present invention is not limited to the foregoing examples, but may be applied widely for the purpose of supporting the rotating shaft of a motor. This bearing unit, as described above, has a bearing clearance (radial bearing clearance) of high accuracy in the radial bearing part R3. The bearing unit is thus particularly suited to supporting a rotating shaft, including that of the foregoing spindle motor for driving a magnetic disk such as HDD, as well as other small-sized motors intended for information devices which require high rotational accuracy, such as a spindle motor for driving a magneto-optical disk of an optical disk and a polygon scanner motor of a laser beam printer. It is also applicable to fan motors and the like that require long life.

While the foregoing description has dealt with the case where the bearing 205 is used as a bearing for rotation, the bearing 205 may also be applied to a bearing for sliding and a bearing for rotation and sliding instead. When the present invention is applied to a bearing for sliding or for rotation and sliding, the range of sliding of the bearing must be set so that the bearing will not interfere with the step between the large-diameter portion and the small-diameter portion of the shaft member.

Hereinafter, a fourth embodiment of the present invention will be described with reference to FIGS. 29 to 33.

FIG. 29 shows a configuration example of a bearing unit 301 according to the fourth embodiment. In FIG. 29, the bearing unit 301 includes a shaft 302 and a bearing member 303 into the interior of which the shaft 302 can be inserted. Of these, the bearing member 303 is composed of an electroformed part 304 and a resin part 305 which is formed integrally with the electroformed part 304 as a die formed part, and is integrally injection molded of a resin material with the electroformed part 304 as an insert.

The bearing member 303 is shaped to open at one end (closed-bottomed cylindrical shape). A tapered surface 306 which gradually increases in diameter toward the outside of the bearing is formed in the interior of the open end. In this configuration example, the tapered surface 306 is formed by the electroformed part 304. More specifically, the inner periphery of the diameter-increasing portion of the electroformed part 304, shaped to increase in diameter gradually toward the external open side at one end, makes the tapered surface 306. Consequently, as shown in FIG. 29, when the shaft 302 is inserted into the interior of the bearing member 303, the inner periphery 304a of the electroformed part 304 and the outer periphery 302a of the shaft 302 create a bearing clearance 307 therebetween. In addition, a sealing space 308 of tapered shape, gradually increasing in radial dimension toward the outside of the bearing, is created between the tapered surface 306, which constitutes the inner periphery of the bearing member 303 along with the inner periphery 304a, and the outer periphery 302a of the shaft 302.

The internal space of the bearing, including the bearing clearance 307, (the area indicated by scattered points in FIG. 29) is filled with a lubricating oil. The oil level of the lubricating oil is always maintained within the sealing space 308. It should be appreciated that both the bearing clearance 307 and the sealing space 308 shown in FIG. 29 are extremely small as compared to the radial dimensions of the shaft 302 and the bearing member 303, whereas FIG. 29 shows the clearance width of the bearing clearance 307 and the clearance width of the sealing space 308 as magnified (exaggerated) relative to the radial dimension of the shaft 302 for the sake of easy understanding of shape.

In the bearing unit 301 of the foregoing configuration, when the shaft 302 makes a relative rotation, the lubricating oil filled in the bearing clearance 307 forms an oil film, and through this oil film the shaft 302 is radially supported on the bearing member 303 so as to be capable of relative rotation. In the meantime, a spherical surface 302b formed on the one side (closed side) of the shaft 302 is supported in contact by the opposed inner bottom 304b of the electroformed part 304 through the lubricating oil. The shaft 302 is thus supported in the thrust direction with respect to the bearing member 303 so as to be capable of relative rotation.

Here, since the sealing space 308 is formed next to the air open side of the bearing clearance 307, the lubricating oil near the oil level always undergoes a pulling force toward smaller radial dimensions (toward the bearing clearance 307) by means of capillary force occurring in the sealing space 308. This can prevent the lubricating oil from leaking out of the bearing from the bearing clearance 307, and retain the lubricating oil inside the bearing.

Furthermore, since the opening side of the bearing unit 301 is provided with the sealing space 308 which gradually increases in radial dimension toward the outside of the bearing, the amount of oil retained in the bearing increases. This lubricating oil can thus be supplied to the bearing clearance 307 with stability. Specifically, it is possible to exercise high sealing performance while retaining a sufficient amount of lubricating oil inside the bearing, provided that the sealing space 308 has a volume Vs five or more times the volume Vb of the bearing clearance 307. The reason is that it becomes difficult to retain a required amount of lubricating oil inside the bearing if Vs/Vb is too small {if (Vs/Vb)<5}.

Hereinafter, an example of the steps for manufacturing the bearing unit 301 will be described with emphasis on the steps for manufacturing the bearing member 303.

The bearing member 303 is manufactured through the steps of: masking, with an insulating material, the outside surface of a master 309 to be used in electroforming; performing electroforming on the masked master 309 to form the electroformed part 304; die forming (insert molding) the bearing member 303 with the master 309 having the electroformed part 304 as an insert; and separating the electroformed part 304 and the master 309.

The master 309, or the molding matrix of the electroformed part 304, has a shaft-like shape, and is made of quenched stainless steel, for example, with a perfect circular profile in section. In this example, the master 309 is shaped to have different diameters. As shown in FIG. 30, it is shaped to have a small-diameter portion 310, a large-diameter portion 311, and a tapered portion 312 formed between the small-diameter portion 310 and the large-diameter portion 311 in an integral configuration. Aside from stainless steel, the material of the master 309 may be selected arbitrarily regardless of whether metal or nonmetal as long as it has a masking capability, conductivity, and chemical resistance like chromium based alloys and nickel based alloys. It should be appreciated that while this description deals with the case where the master 309 with different diameters is made out of a single material by cutting, forging, or the like, the master 309 may be made of a combination of two or more materials. For example, the master 309 having the foregoing configuration may be formed by subjecting a shaft-like material of constant diameter to coating (for example, ceramic coating) or the like of equivalent thicknesses at respective areas corresponding to the large-diameter portion 311 and the tapered portion 312.

The master 309 may be a solid shaft (solid-core shaft), as well as a hollow shaft or a solid-core shaft that has a hollow filled with resin. Moreover, the outer periphery of the master 309, or the outer periphery 310a of the small-diameter portion 310 corresponding to the inner periphery 304a of the electroformed part 304 which makes the bearing surface in particular, is desirably finished with as high accuracy as possible since the accuracy directly governs the surface accuracy of the inner periphery 304a.

As shown in FIG. 30, the outside surface of the master 309 is subjected to masking at areas excluding where to form the electroformed part 304 (the area of the outer periphery 311a of the large-diameter portion 311). These areas are coated to form a masked portion 313. The coating material for forming the masked portion 313 is selected and used from among materials that have an insulating property and corrosion resistance against electrolyte solutions.

The electroforming is performed by immersing the master 309 into an electrolyte solution that contains such metal ions as Ni and Cu, and energizing the electrolyte solution to electrodeposit the intended metal(s) on the outside surface of the master 309 at areas excluding the masked portion 313 (the outer periphery 310a of the small-diameter portion 310, the end face 310b, and the outer periphery 312a of the tapered portion 312). The electrolyte solution may contain sliding materials such as carbon, and stress relief materials such as saccharin if needed. The types of metals to deposit are selected as appropriate depending on property requirements, such as hardness necessary for the bearing surface of the bearing member 303 and resistance against the lubricating oil (oil resistance).

Through the foregoing steps, as shown in FIG. 31, the electroformed shaft 314 is manufactured in which the electroformed part 304 is formed on the surface of the master 309 at areas other than where the masked portion 313 is formed. At this stage, the electroformed shaft 314 has the configuration that the electroformed part 304 of closed-bottomed cylindrical shape is formed on one axial end on the outside surface of the master 309. In addition, the tapered surface 306 which gradually increases in diameter toward the large-diameter portion 311 is formed inside the axial bottom of the electroformed part 304 (on the side of the large-diameter portion 311), along the shape of the outer periphery 312a of the tapered portion 312. Note that the electroformed part 304 can cause a drop in the durability and the like of the bearing surface (inner periphery 304a) if its thickness is too small, and can lower the detachability from the master 309 if too large. An optimum thickness is thus set to a range of, for example, 10 μm to 200 μm according to the required bearing performance and bearing size, as well as the intended application and so on.

The electroformed shaft 314 manufactured through the foregoing steps is supplied and placed, as an insert, into a mold for insert molding the bearing member 303.

FIG. 32 conceptually shows an example of the step for insert molding the bearing member 303, in which a mold consisting of a movable mold 315 and a fixed mold 316 is provided with a runner 317, a gate 318, and a cavity 319. In this example, the gate 318 is a point gate (single point gate) shown in FIG. 32, and is formed in the molding mold at a position corresponding to the center of one end of the resin part 305. The gate area of the gate 318 is set to an appropriate value according to the viscosity of the molten resin to be filled into and the shape of the molded article.

The electroformed shaft 314 is positioned inside the mold of the foregoing configuration, in which state the movable mold 315 is brought closer to the fixed mold 316 for clamping. Next, in the clamped state, molten resin P is injected and filled into the cavity 319 through a sprue (not shown), the runner 317, and the gate 318, thereby molding the resin part 305 integrally with the electroformed shaft 314. Consequently, the resin part 305 is molded to the shape corresponding to the cavity 319 which is formed in the molds 315 and 316.

Base resins available for the molten resin P include crystalline resins such as liquid crystal polymer (LCP), polyphenylene sulfide (PPS), polyetheretherketone (PEEK), polyacetal (POM), and polyamide (PA), and amorphous resins such as polyphenylsulfone (PPSU), polyethersulfone (PES), polyetherimide (PEI), and polyamideimide (PAI). These are just a few examples, of course, and any resin material applicable to the intended application and the use environment of the bearing may be selected. Various types of fillers including reinforcing materials (regardless of form, whether fibrous or powder), lubricants, and conductive agents may be added if necessary.

After the mold is opened, the molded article having the master 309, the electroformed part 304, and the resin part 305 integrally is released from the molds 315 and 316. In the subsequent separation step, this molded article is separated into the bearing member 303 which is composed of the electroformed part 304 and the resin part 305, and the master 309. While the masked portion 313 may be removed beforehand in a stage prior to the separation step, it may be left on the master 309 up to the separation step unless otherwise restricted.

In the separation step, an impact is applied to the master 309 or the electroformed part 304, for example, so that the inner periphery 304a of the electroformed part 304 and the tapered surface 306 are detached from the outside surface (the outer peripheries 310a and 312a, and the end face 310b) of the master 309. The master 309 is thereby pulled out of the bearing member 303 (electroformed part 304) to provide the finished product of the bearing member 303.

Aside from the foregoing means of separation, the electroformed part 304 may be separated, for example, by means of a method of heating (or cooling) the electroformed part 304 and the master 309 to cause a difference in the amount of thermal expansion therebetween, or by using both the means (impact and heat) in combination.

An shaft 302 that is fabricated separately from the pulled master 309 is inserted into the interior of the bearing member 303 formed thus, thereby completing the bearing unit 301 shown in FIG. 29.

In this way, the electroformed part 304 (the bearing member 303) having the tapered surface 306 integrally formed thereon can be obtained by performing electroforming, using the master 309 that is shaped so that the outer periphery 310a of the small-diameter portion 310 and the outer periphery 311a of the large-diameter portion 311a are connected via the outer periphery 312a of the tapered portion 312. Consequently, it is possible to form the tapered surface 306 simultaneously and integrally with the electroformed part 304 in an economical fashion without an additional step of forming the tapered surface 306.

According to the bearing unit 301 of this configuration example, the inner periphery 304a of the electroformed part 304 is formed with high accuracy, so that the bearing clearance 307 to be created with the outer periphery 302a of the shaft 302 can be set to a small value (of the order of several micrometers). This makes it possible, for example, to ensure the volume ratio (Vs/Vs) of the sealing space while setting the tapered surface 306 to a gentle tilt angle so that the volume Vs has a relatively small absolute value, thereby providing a bearing unit 301 that has both high sealing capability and bearing performance.

While an example of the bearing unit 301 according to the fourth embodiment has been described above, the present invention is not limited to the foregoing example.

The foregoing example has dealt with the case where the tapered surface 306 is formed inside the opening in one axial side of the bearing member 303. Nevertheless, openings may be formed in both axial ends so that tapered surfaces gradually increasing in diameter toward the outside of the bearing are formed inside both the openings. FIG. 33 shows a bearing unit 321 according to a modification of the fourth embodiment. In FIG. 33, the bearing unit 321 includes a shaft 322 and a bearing member 323 into the interior of which the shaft 322 can be inserted. The bearing member 323 is composed of an electroformed part 324 and a resin part 325 which is formed integrally with the electroformed part 324 as a die formed part. The bearing member 323 is opened at both axial ends thereof. The interiors of both the openings are provided with respective tapered surfaces 326 and 327 which gradually increase in diameter toward the outside of the bearing. The tapered surfaces 326 and 327 and the opposed outer periphery 322a of the shaft 322 create sealing spaces 328 and 329 of tapered shape, respectively, which gradually increase in radial dimension toward the outside of the bearing. The inner periphery 324a of the electroformed part 324 and the opposed outer periphery 322a of the shaft 322 create a bearing clearance 330 therebetween, which communicates with the foregoing sealing spaces 328 and 329 at respective outer sides of the bearing.

Here, one tapered surface 326 can be formed integrally with the electroformed part 324, for example, by using the master 309 having the shape shown in FIG. 30. Moreover, the other tapered surface 327 can be formed simultaneously with the molding of the resin part 325, for example, by providing either one of the molds 315 and 316 shown in FIG. 32 (for example, the movable mold 315) with a molding portion that has a shape corresponding to the tapered surface 327, and using this mold. It is understood that both the tapered surfaces 326 and 327 may be molded in a mold simultaneously with the molding of the resin part 325. Similarly, the tapered surface 306 of the bearing unit 301 shown in FIG. 29 can also be molded in a mold simultaneously with the molding of the resin part 305.

The sealing space 308 may be adjusted in shape, size, and the like when necessary, by means of the surface configuration of the molding master 309 and the configuration of the molding surfaces of the molds 315 and 316. For example, though not shown in the drawings, a master 309 having a step interposed between the small-diameter portion 310 and the tapered portion 312 can be used to form a sealing space of increased sealing capacity. Here, since the volume of the sealing space can be adjusted mainly by the step width of the master 309 (the radial width of the end face of the step), it is possible to set the tilt angle of the tapered surface 306 with consideration given to the pulling force toward the inside of the bearing alone, with an increase in design flexibility. It should be appreciated that a sealing space having a constant radial dimension or a sealing space having a different tilt angle than that of the tapered surface 306, 326, or 327 may be formed continuously to the sealing space 308, 328, or 329. The forming position of the sealing space can also be set arbitrarily as long as the sealing space communicates with the bearing clearance 307 at an outer side of the bearing.

The foregoing example has also dealt with the case where the die formed part to be integrally formed with the electroformed part 304 is formed by injection molding of resin (forming the resin part 305). Nevertheless, the die formed part may be made of other materials as long as it is die formed, like by die forming (molding) of metal. In addition, the die formed part may also be made of sintered metal, for example, which is formed by compacting (die forming) metal powder, followed by sintering.

Moreover, while the foregoing example has dealt with the case where the sealing space 308 is created between the tapered surface 306 formed on the bearing member 303 (the interior of the electroformed part 304 and the interior of the resin part 305) and the opposed outer periphery 302a of the shaft 302, the present invention is not limited thereto. That is, it is only essential to form a sealing space 308 of tapered shape that communicates with the bearing clearance 307 at an outer side of the bearing and gradually increases in radial dimension toward the outside of the bearing. For example, though not shown in the drawings, the outer periphery 302a of the shaft 302 may be provided with a tapered surface which gradually decreases in diameter toward the outside of the bearing, so that a sealing space of tapered shape is created between this tapered surface and the opposed inner periphery of the bearing member 303.

The foregoing example has also dealt with the case where the bearing clearance 307 constitutes a fluid lubrication bearing. In addition, a so-called dynamic bearing may be constituted by providing the inner periphery 304a with a dynamic pressure generating portion for producing the action of increasing the dynamic pressure of fluid. In that case, for example, though not shown in the drawings, an area may be formed where a plurality of grooves (dynamic pressure generating grooves) tilted with respect to the axial direction are arranged in a herringbone configuration. Alternatively, again though not shown, a plurality of lobe surfaces may be formed on the inner periphery 304a so as to constitute a so-called multi-lobe bearing in which these lobe surfaces and the cylindrical outer periphery 302a of the shaft 302 opposed to the lobe surfaces create circumferentially-wedged radial clearances therebetween. These radial dynamic pressure generating portions may also be formed on the outer periphery 302a of the shaft 302 aside from the inner periphery of the bearing member 303 (the inner periphery 304a of the electroformed part 304).

Furthermore, the foregoing example has used the lubricating oil as an example of the fluid that is filled into the bearing unit 301 and forms a lubricating film in the bearing clearance 307. This is not restrictive, however, and it is possible to use gases such as air, flowable lubricants such as magnetic fluids, lubricating grease, etc.

The bearing unit according to the present embodiment has a high sealing capability as described above, and is thus suitably applicable to bearings of small-sized motors intended for information devices which require a high level of cleanness as well as high rotational accuracy, including a spindle motor for driving a magnetic disk of HDD or the like, a spindle motor for driving a magneto-optical disk of an optical disk, and a polygon scanner motor of a laser beam printer.

Figure 1:
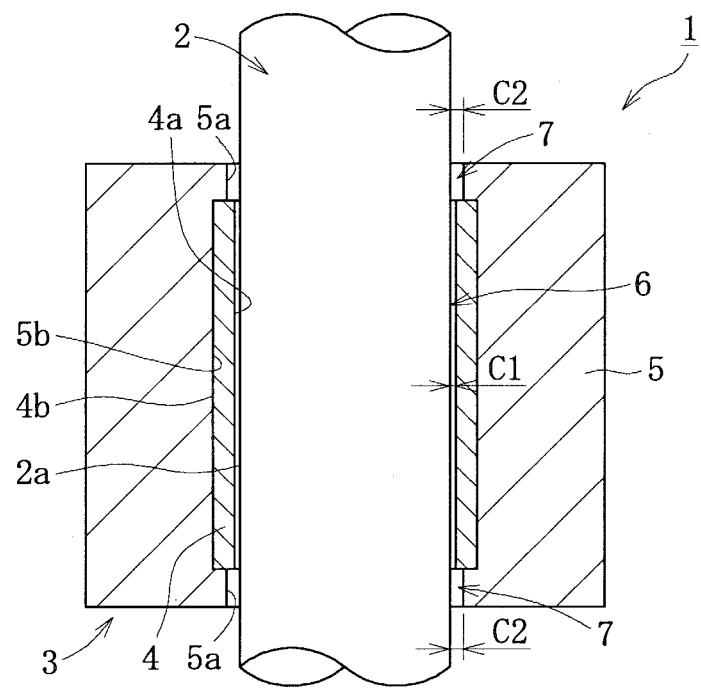
FIG. 1 is a cross-sectional view showing a configuration example of a bearing unit according to a first embodiment of the present invention.
Figure 2:
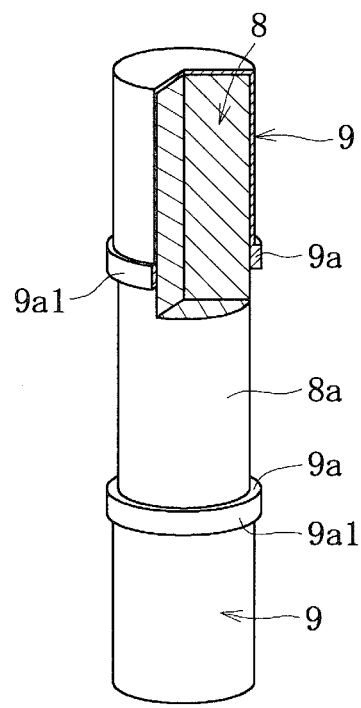
FIG. 2 is a perspective view of a master on which a non-conductive coating is formed.
Figure 3:
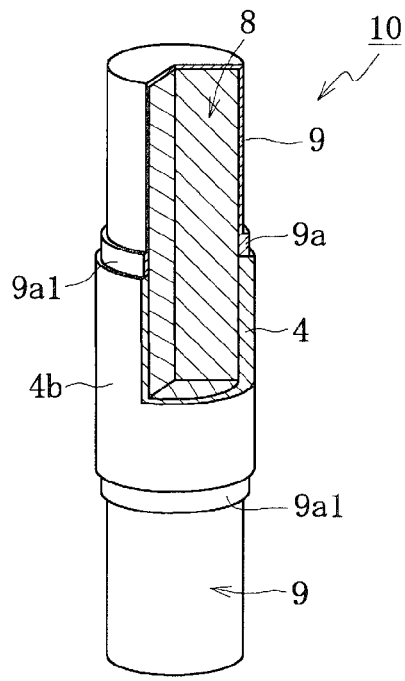
FIG. 3 is a perspective view of an electroformed shaft having the nonconductive coating.
Figure 4:
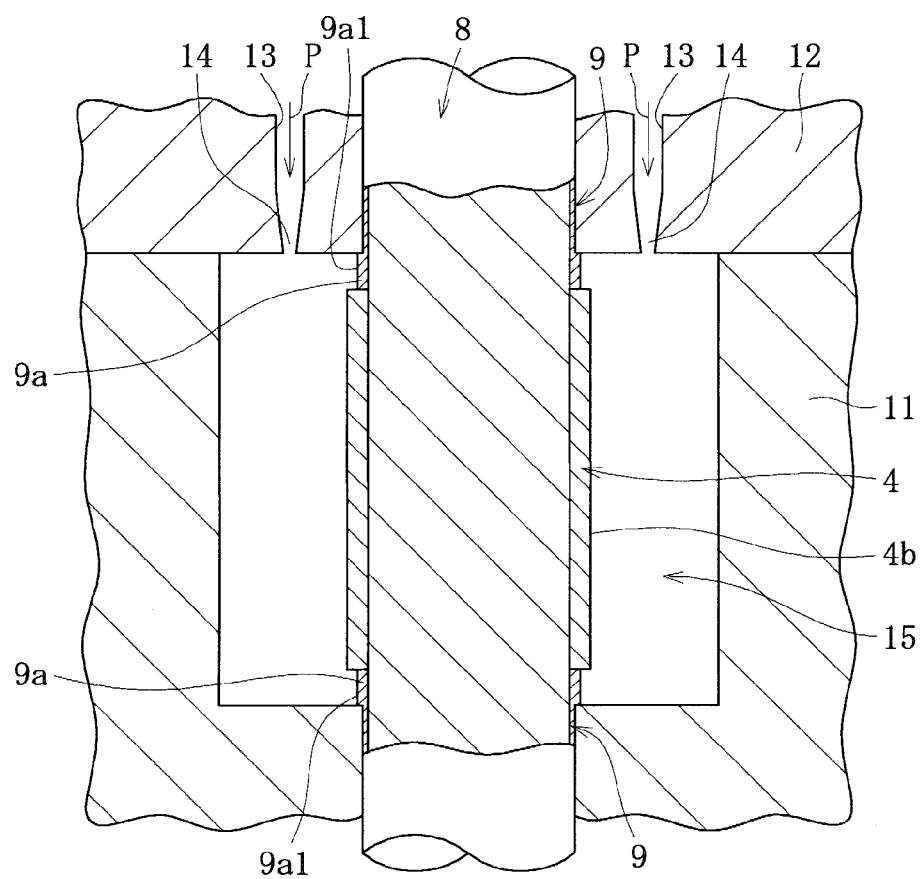
FIG. 4 is a diagram conceptually showing an example of the step of die forming a bearing member.
Figure 5:
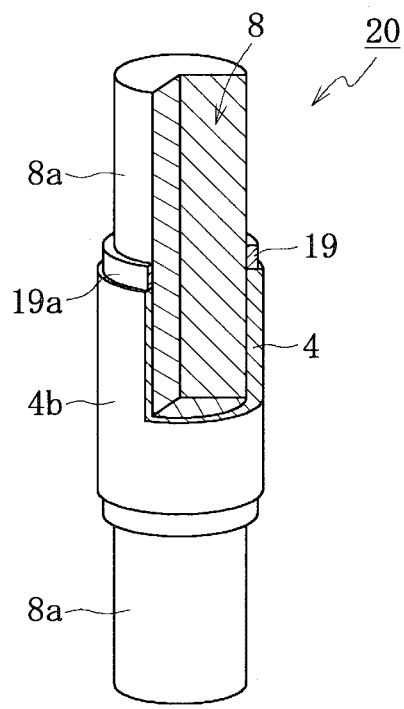
FIG. 5 is a perspective view of an electroformed shaft on which a resin coating is formed.
Figure 6:
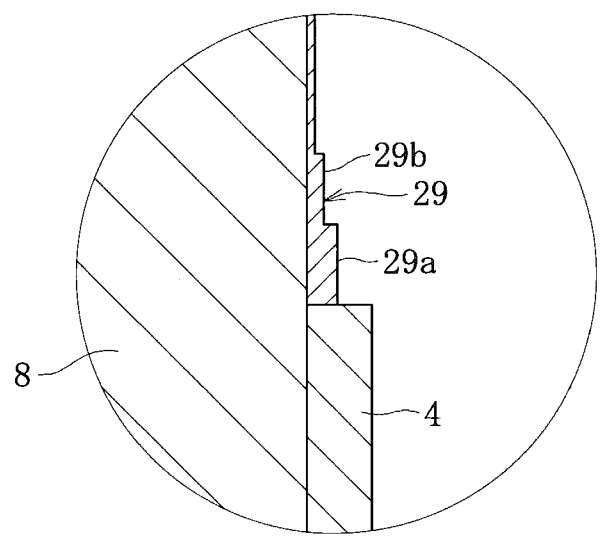
FIG. 6 is an enlarged view showing an essential part of a first modification of the electroformed shaft.
Figure 7:
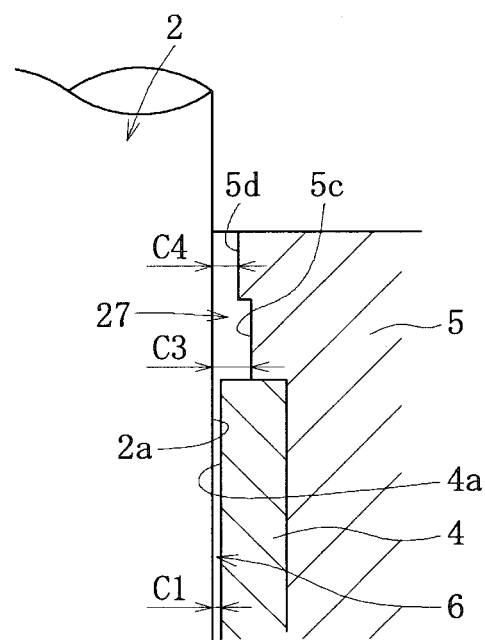
FIG. 7 is an enlarged view showing an essential part of a bearing unit which is made with the electroformed shaft according to the first modification.
Figure 8:
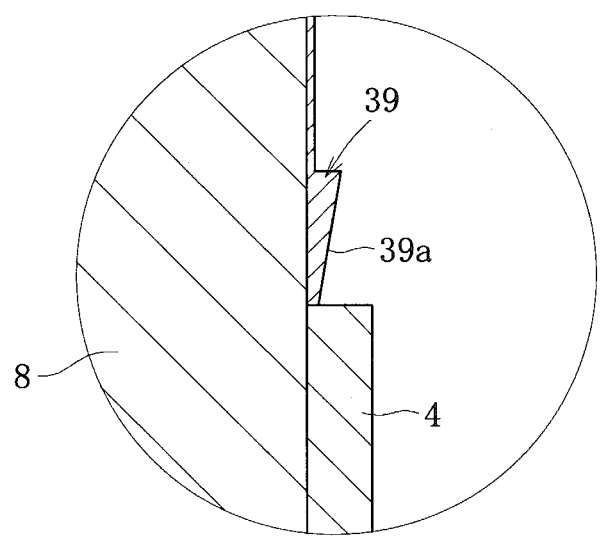
FIG. 8 is an enlarged view showing an essential part of a second modification of the electroformed shaft.
Figure 9:
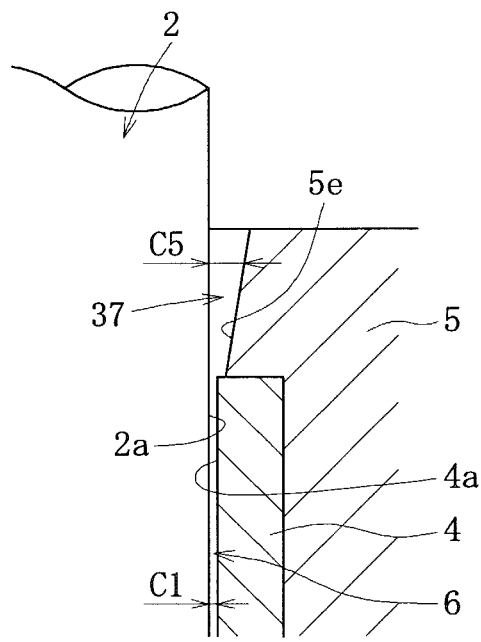
FIG. 9 is an enlarged view showing an essential part of a bearing unit which is made with the electroformed shaft according to the second modification.
Figure 10:
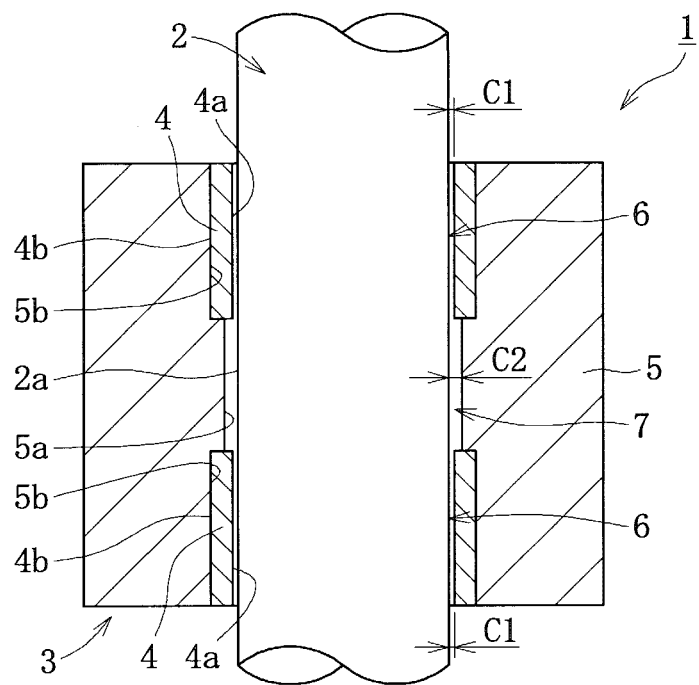
FIG. 10 is a cross-sectional view showing a third modification of the bearing unit.
Figure 11:
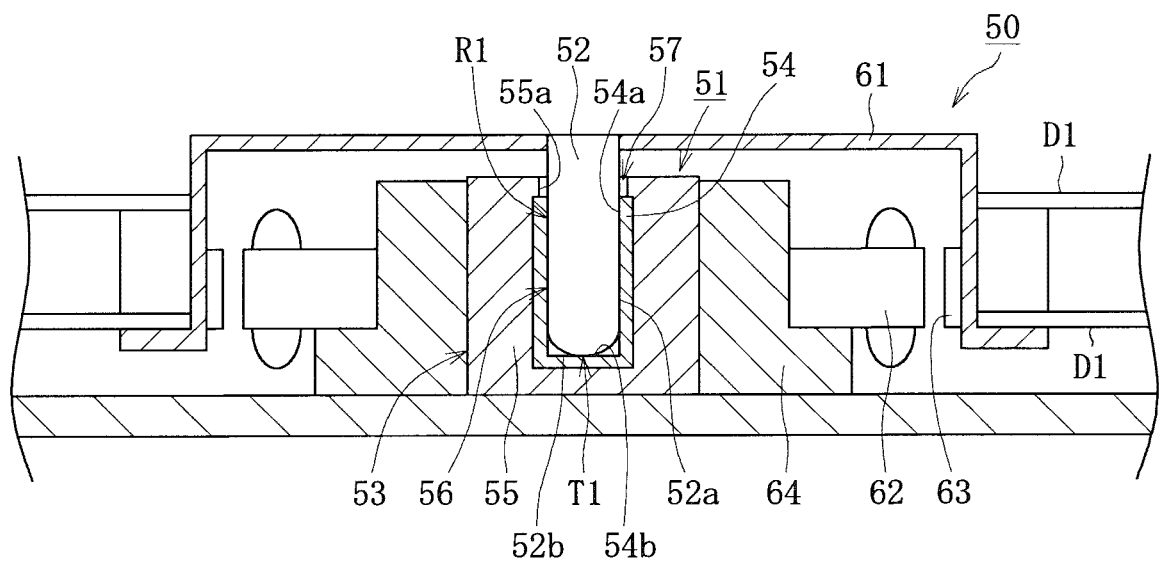
FIG. 11 is a cross-sectional view showing a configuration example of a motor having the bearing unit.
Figure 12:
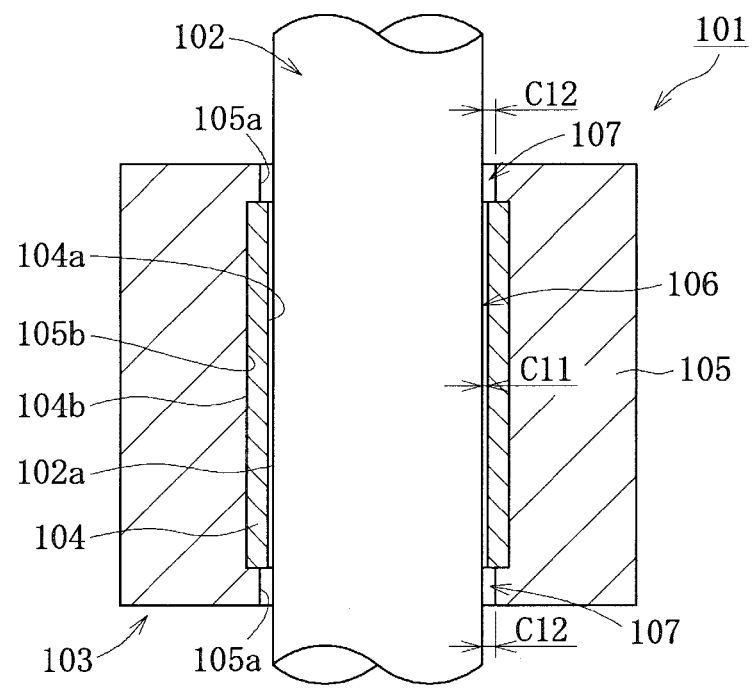
FIG. 12 is a cross-sectional view showing a configuration example of a bearing unit according to a second embodiment of the present invention.
Figure 13:
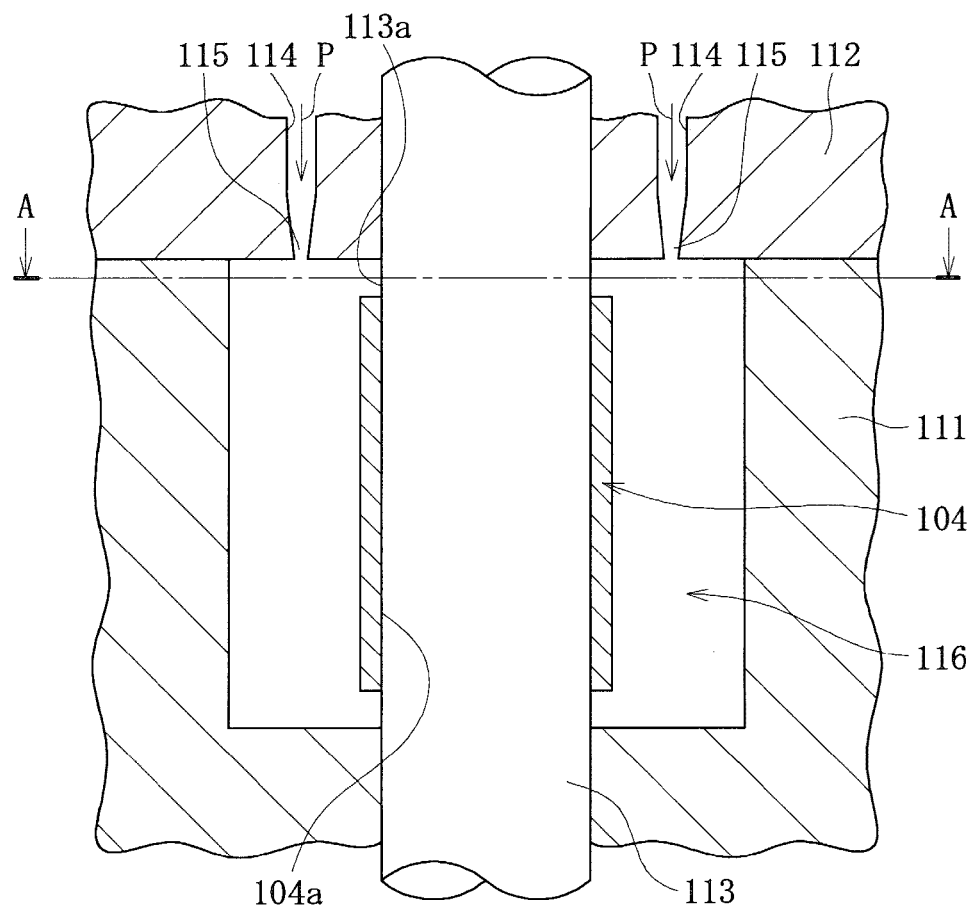
FIG. 13 is a diagram conceptually showing an example of the step of die forming a bearing member.
Figure 14:
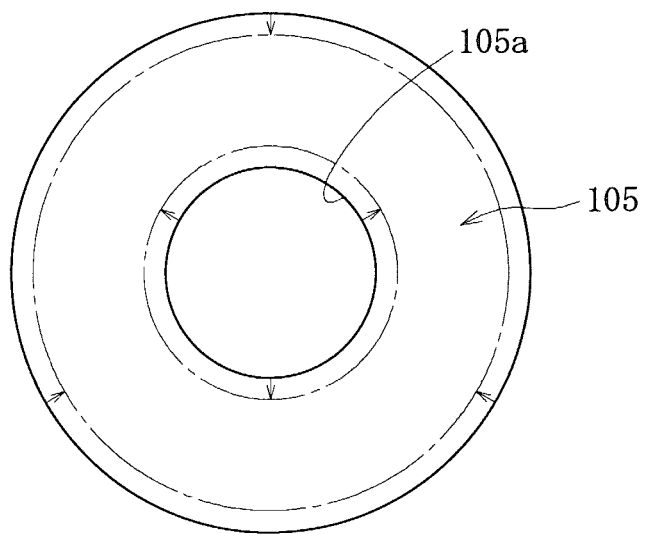
FIG. 14 is a diagram schematically showing the molding shrinkage of the resin part in section A-A of FIG. 13.
Figure 15:
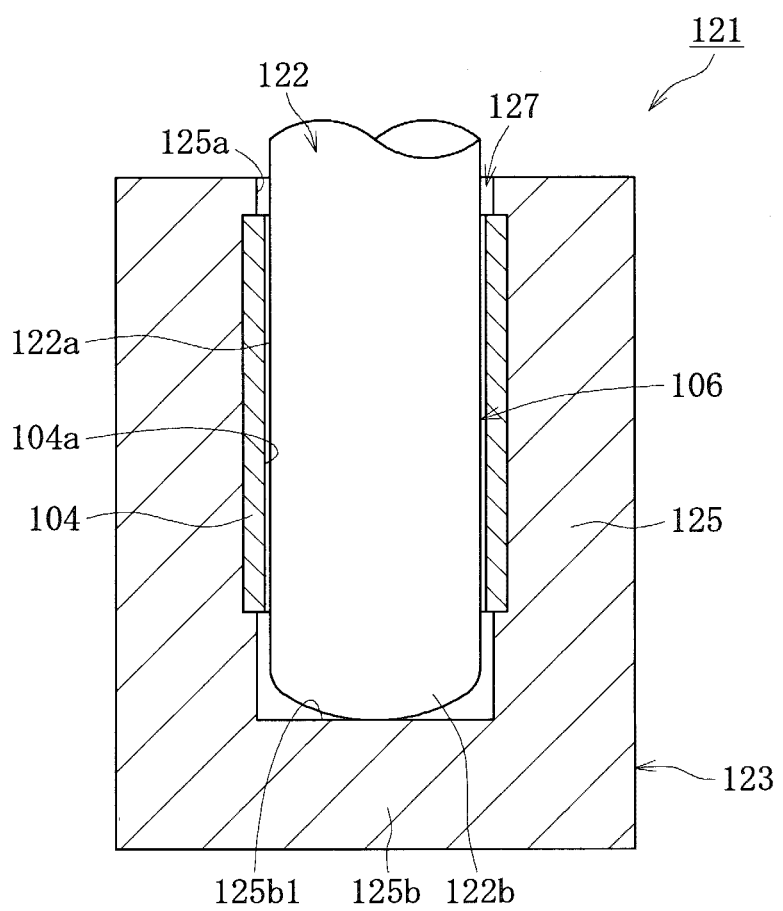
FIG. 15 is a cross-sectional view showing a first modification of the bearing unit.
Figure 16:
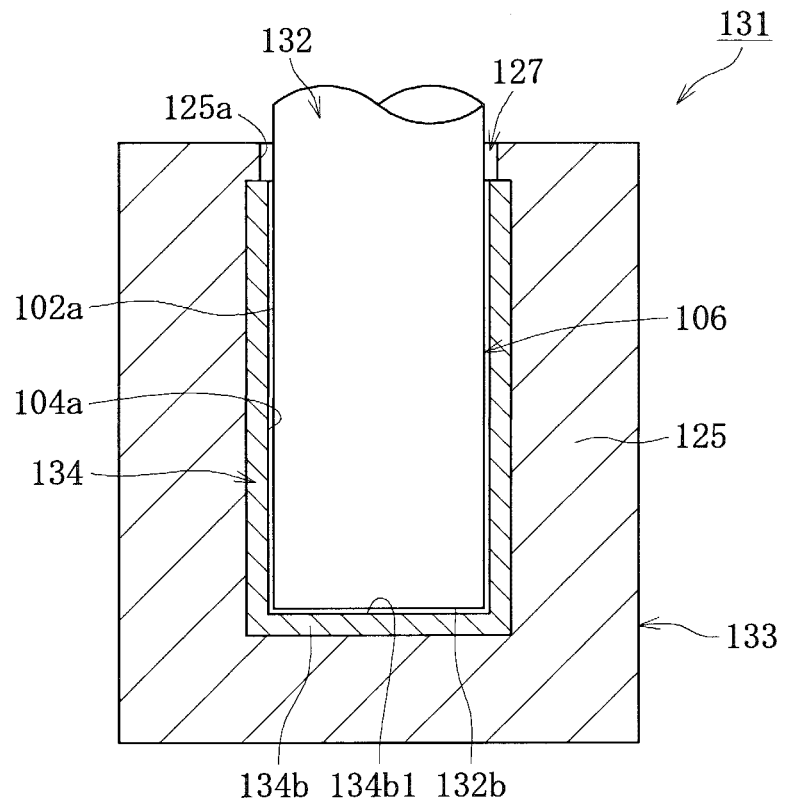
FIG. 16 is a cross-sectional view showing a second modification of the bearing unit.
Figure 17:
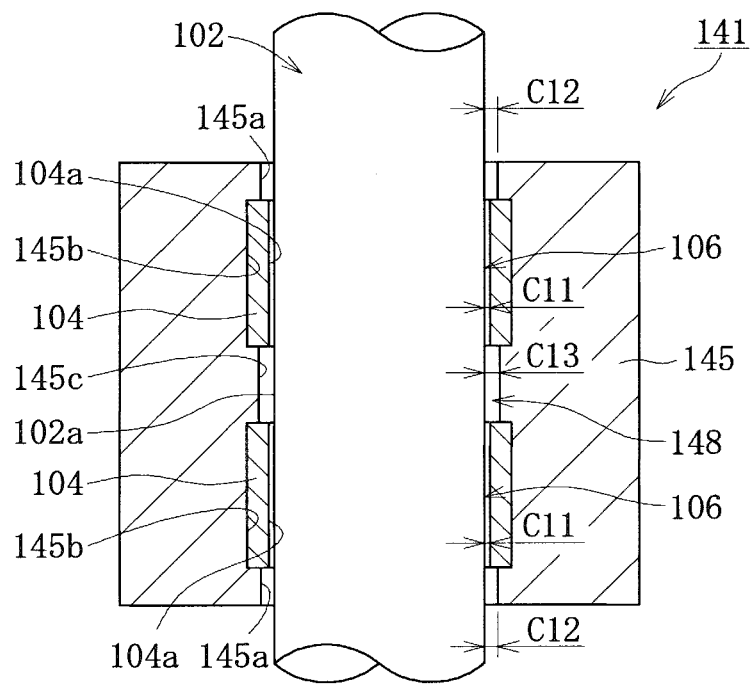
FIG. 17 is a cross-sectional view showing a third modification of the bearing unit.
Figure 18:
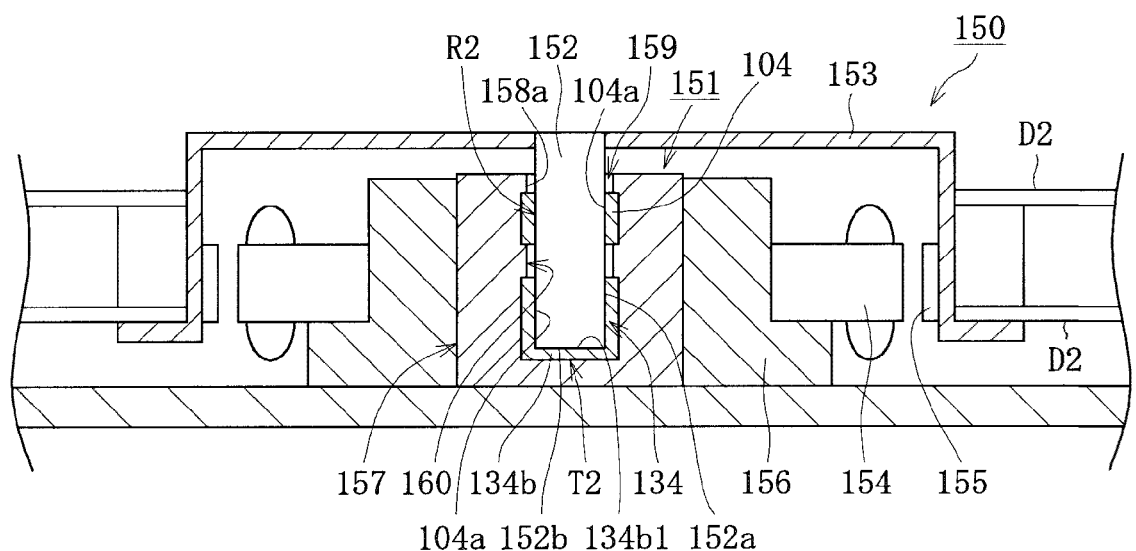
FIG. 18 is a cross-sectional view showing a configuration example of a motor having the bearing unit.
Figure 19:
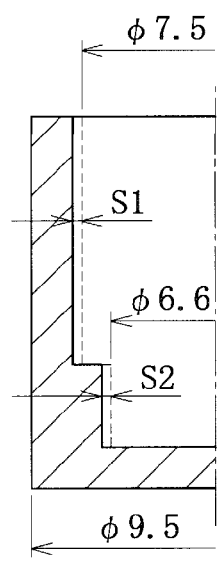
FIG. 19 is a cross-sectional view showing a test piece that was used in a shrink test on the resin part.
Figure 20:
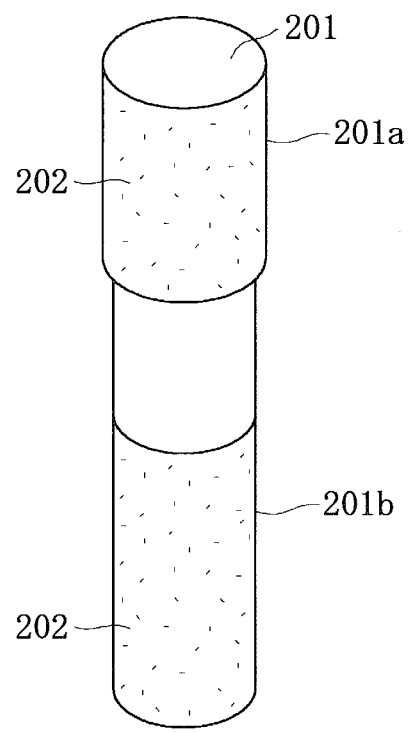
FIG. 20 is a perspective view showing an example of a shaft member according to a third embodiment of the present invention.
Figure 21:
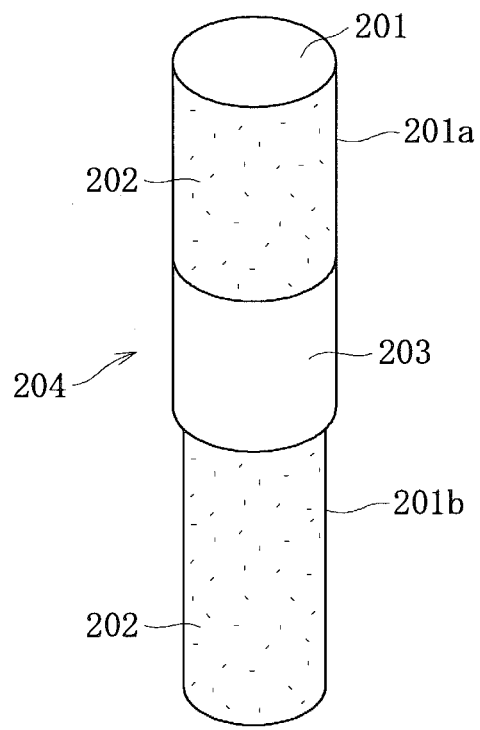
FIG. 21 is a perspective view showing an example of an electroformed shaft, or a stepped master provided with an electroformed part.
Figure 22:
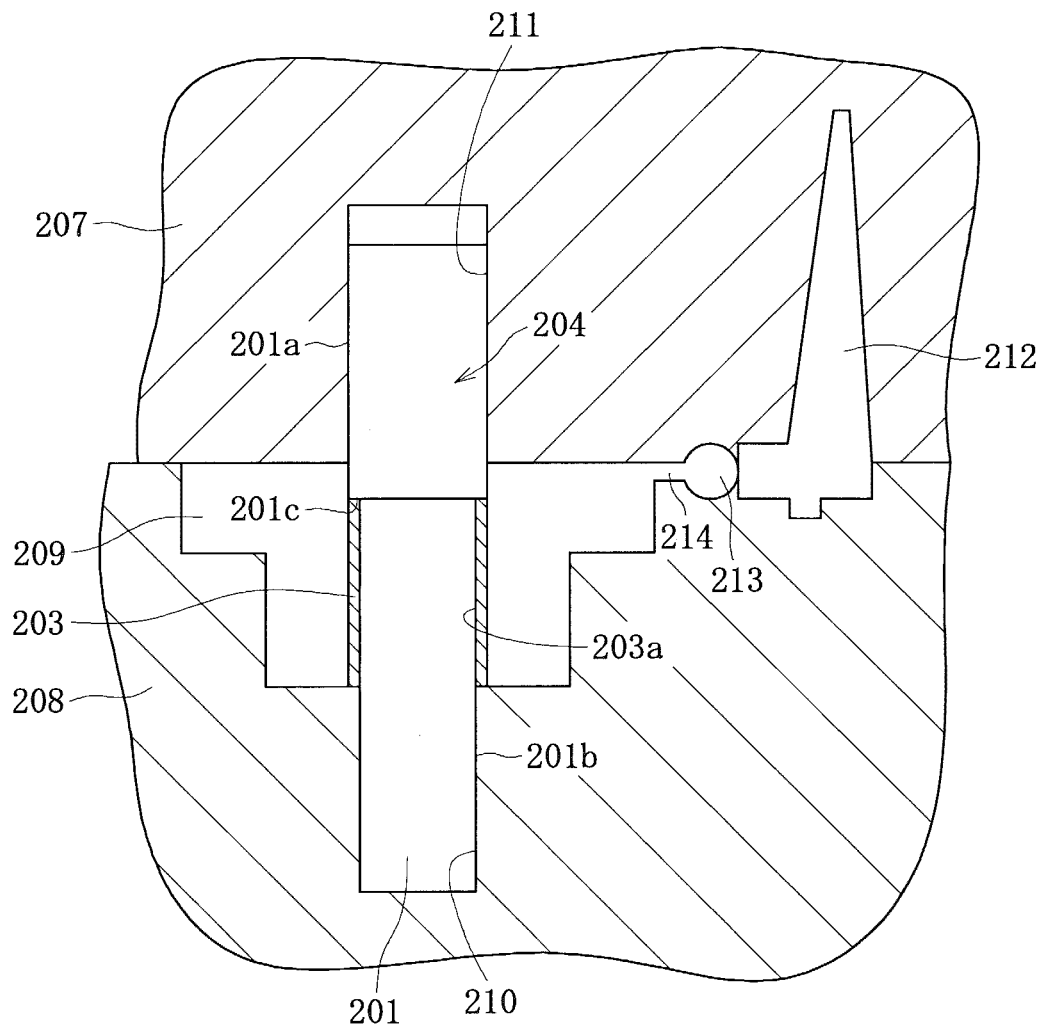
FIG. 22 is a diagram conceptually showing an example of the step of die forming a bearing.
Figure 23:
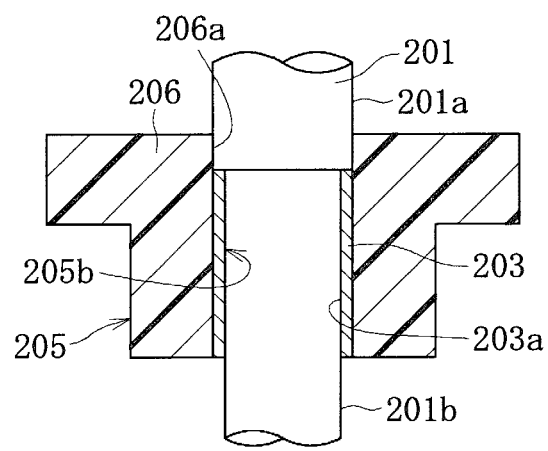
FIG. 23 is a cross-sectional view of a bearing in which a bearing and a shaft member are molded integrally.
Figure 24:
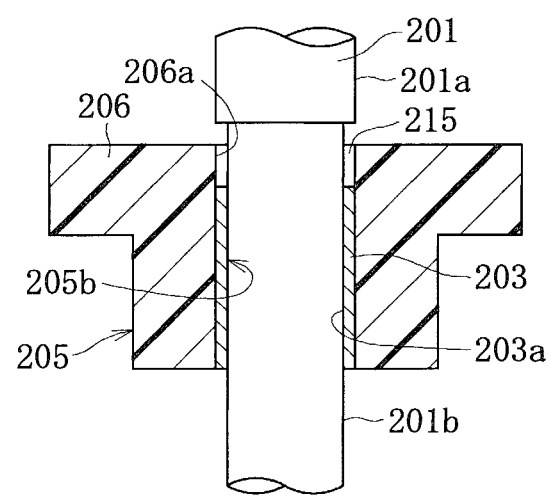
FIG. 24 is a cross-sectional view showing a configuration example of a bearing unit according to the third embodiment.
Figure 25:
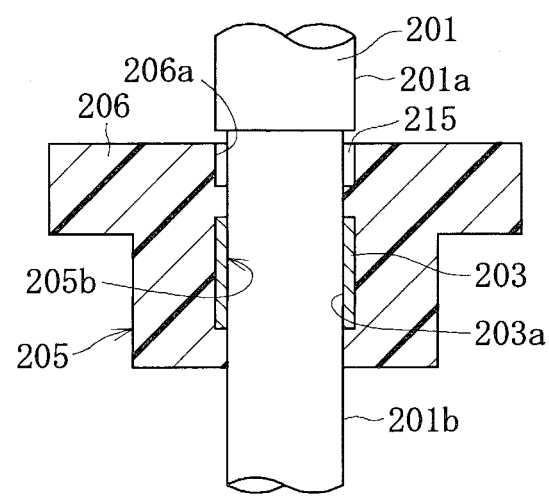
FIG. 25 is a cross-sectional view showing a first modification of the bearing unit.
Figure 26:
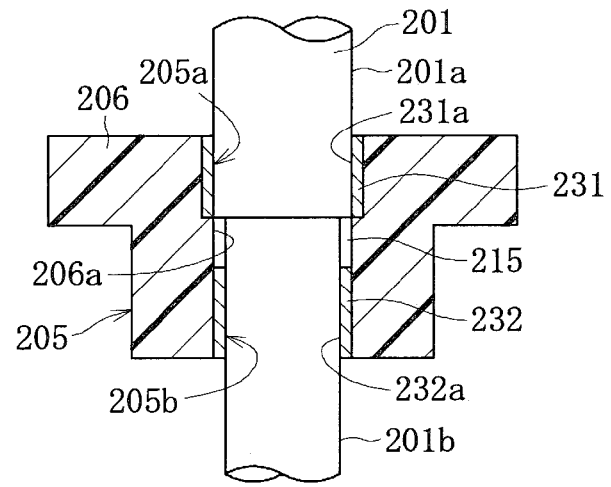
FIG. 26 is a cross-sectional view showing a second modification of the bearing unit.
Figure 27:
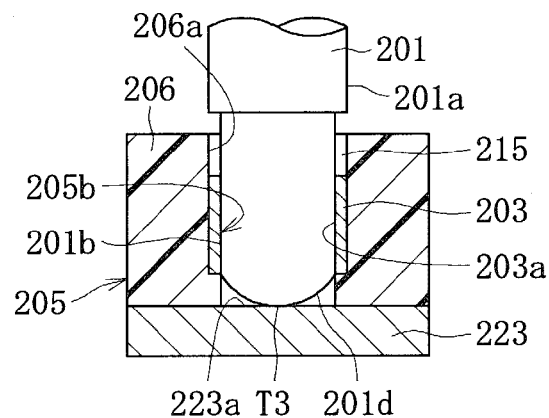
FIG. 27 is a cross-sectional view showing a third modification of the bearing unit.
Figure 28:
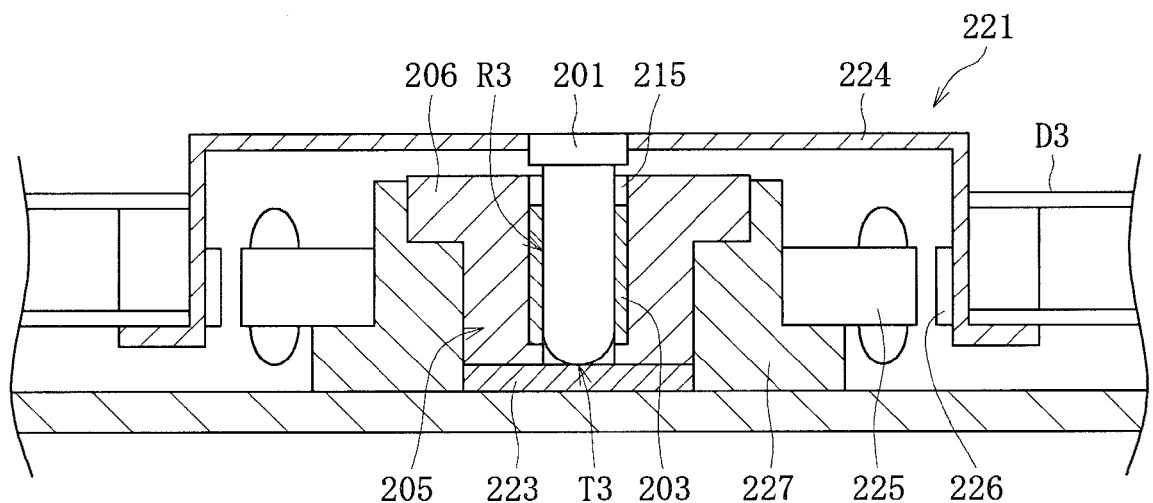
FIG. 28 is a cross-sectional view showing a configuration example of a motor having the bearing unit.
Figure 29:
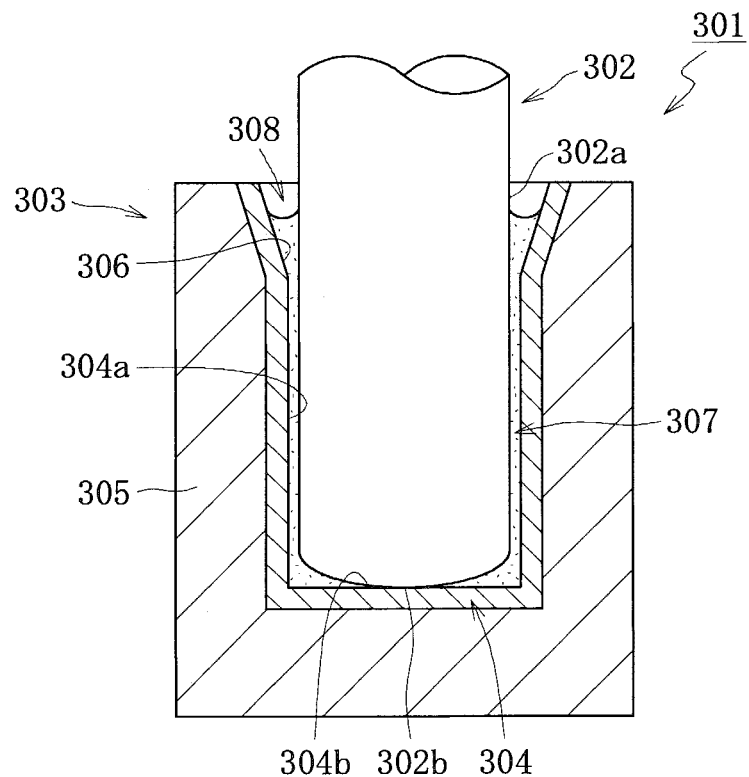
FIG. 29 is a cross-sectional view showing a configuration example of a bearing unit according to a fourth embodiment of the present invention.
Figure 30:
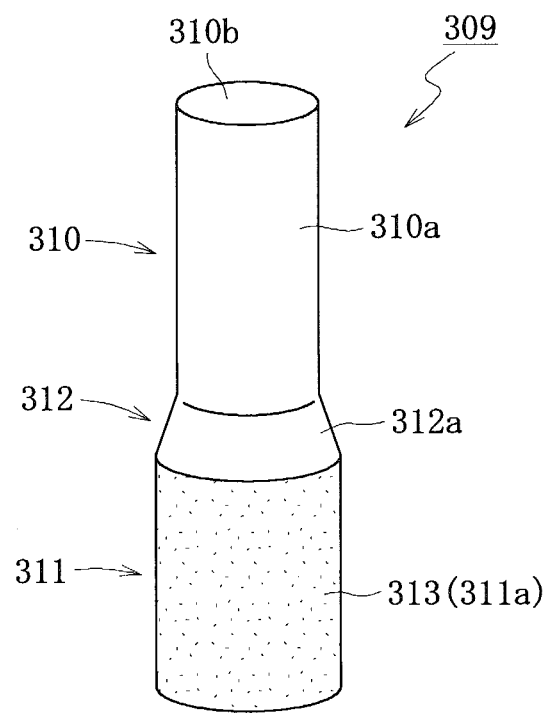
FIG. 30 is a perspective view of a master on which a masked portion is formed.
Figure 31:
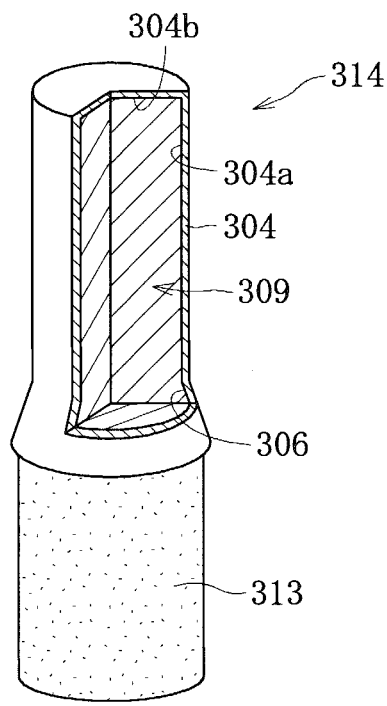
FIG. 31 is a perspective view of an electroformed shaft.
Figure 32:
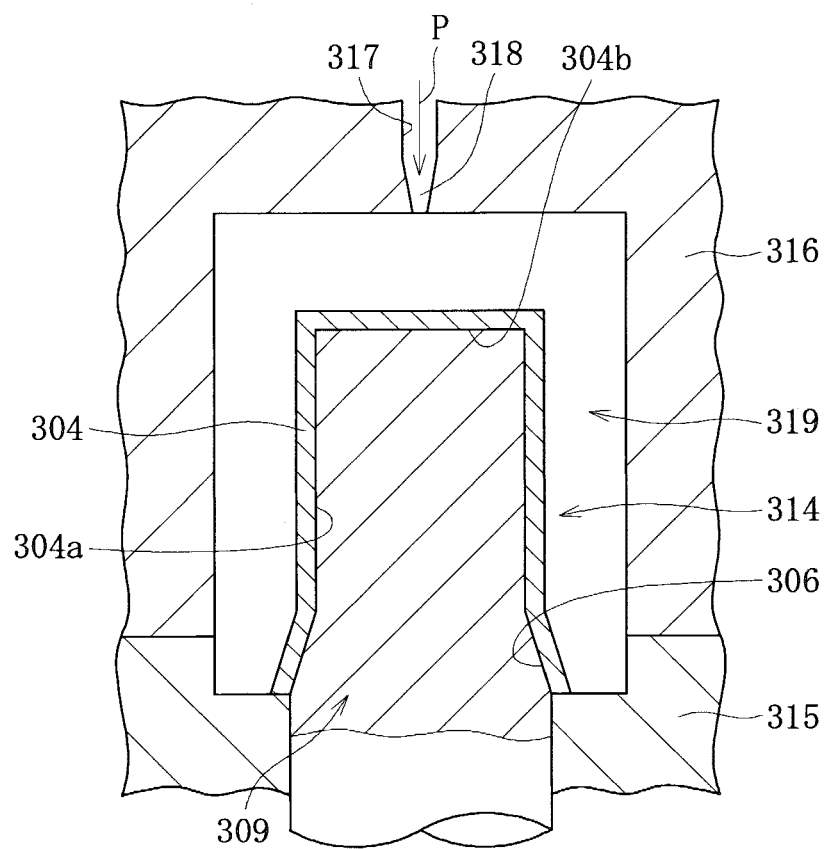
FIG. 32 is a diagram conceptually showing the step of die forming a bearing member.
Figure 33:
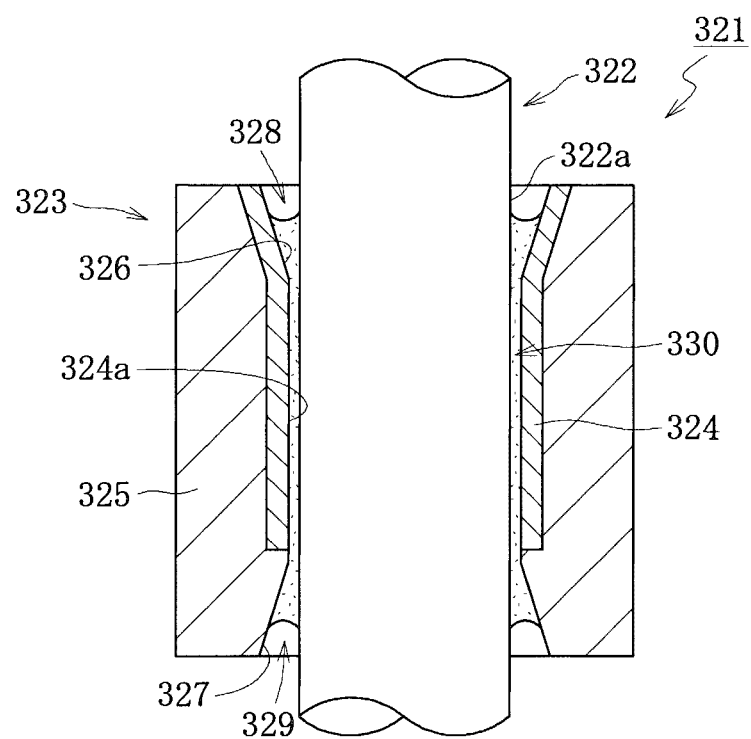
FIG. 33 is a cross-sectional view showing a modification of the bearing unit.

The invention claimed is:

1. A bearing unit comprising:
a bearing member having integrally a cylindrical metal part and a resin part formed by a die forming of the bearing member having the metal part as an insert; and
a shaft inserted into an interior of the bearing member so as to be capable of relative rotation, creating a bearing clearance from an opposed inner periphery of the bearing member, wherein:
the inner periphery of the bearing member comprises an inner periphery of the metal part and an inner periphery of the resin part, the bearing clearance is formed between an outer periphery of the shaft and the inner periphery of the metal part,
the resin part is made of a liquid crystal polymer, the inner periphery of the resin part is a molded surface, a step is formed between the molded surface and the inner periphery of the metal part, and
a small clearance is created between the outer periphery of the shaft and the inner periphery of the resin part by molding shrinkage of the resin part.

2. The bearing unit according to claim 1, wherein the small clearance is formed on at least either one of the axial ends of the bearing member.

3. The bearing unit according to claim 1, wherein a plurality of bearing clearances is formed axially apart from each other so that the small clearance is formed between the adjacent bearing clearances to have a greater clearance width than that of the bearing clearances.

4. The bearing unit according to claim 1, wherein the metal part is formed by electroforming.

\* \* \* \* \*